United States Patent
Aspelmeier et al.

(10) Patent No.: US 9,418,453 B2
(45) Date of Patent: Aug. 16, 2016

(54) TRANSMISSION IMAGE RECONSTRUCTION AND IMAGING USING POISSONIAN DETECTOR DATA

(75) Inventors: Timo Aspelmeier, Goettingen (DE); Gernot Ebel, Goettingen (DE); Uwe Engeland, Goettingen (DE)

(73) Assignee: Scivis wissenschaftliche Bildverarbeitung GmbH, Goettingen (DE)

(*) Notice: Subject to any disclaimer, the term of this patent is extended or adjusted under 35 U.S.C. 154(b) by 243 days.

(21) Appl. No.: 14/232,492

(22) PCT Filed: Jul. 13, 2011

(86) PCT No.: PCT/EP2011/003507
§ 371 (c)(1),
(2), (4) Date: Jan. 13, 2014

(87) PCT Pub. No.: WO2013/007272
PCT Pub. Date: Jan. 17, 2013

(65) Prior Publication Data
US 2014/0140602 A1 May 22, 2014

(51) Int. Cl.
  *G06T 7/00* (2006.01)
  *G06T 11/00* (2006.01)

(52) U.S. Cl.
  CPC ............ *G06T 11/008* (2013.01); *G06T 7/0012* (2013.01); *G06T 11/006* (2013.01); *G06T 2211/424* (2013.01); *G06T 2211/436* (2013.01)

(58) Field of Classification Search
  None
  See application file for complete search history.

(56) References Cited

U.S. PATENT DOCUMENTS 5,396,531 A * 3/1995 Hartley ............... G06K 9/40
                                                    348/E5.086
5,436,829 A * 7/1995 Hartley ............... G06K 9/40
                                                    128/922

(Continued)

FOREIGN PATENT DOCUMENTS

WO  WO 2010/121043 A2 * 4/2010 ............ A61B 6/03
WO  WO2010121043        10/2010
WO  WO2011091815         8/2011

OTHER PUBLICATIONS

Willett, R. et al. "Poisson Image Reconstruction With Total Variation Regularization"—Proceedings of 2010 IEEE 17th International Conference on Image Processing, Sep. 2010.*

(Continued)

*Primary Examiner* — Chan Park
*Assistant Examiner* — Mia M Thomas
(74) *Attorney, Agent, or Firm* — Caesar Rivise, PC

(57) ABSTRACT

An image reconstruction method for reconstructing an image $\underline{f}^{min}$ representing a region of investigation within an object includes providing detector data ($y_i$) having Poisson random values from an X-ray transmission measurement using an X-ray source and a detector device, the detector data ($y_i$) being measured at an i-th of a plurality of different pixel positions of the detector device relative to the object, and reconstructing the image $\underline{f}^{min}$ based on the detector data ($y_i$), the reconstructing step including a procedure of minimizing a functional $$F(\underline{f}) = \frac{1}{k}\sum_{i=1}^{k}(\mu_i - y_i \log \mu_i) + a|T^{-1}\underline{f}|_p$$

where $\underline{f}$ is a current test image used for minimizing the functional $F(\underline{f})$. The image $\underline{f}^{min}$ represents the global minimum of $F(\underline{f})$.

21 Claims, 4 Drawing Sheets

(56) References Cited

U.S. PATENT DOCUMENTS

| | | | | |
|---|---|---|---|---|
| 6,741,739 | B1* | 5/2004 | Vincent | G06T 5/10 382/191 |
| 7,526,060 | B2* | 4/2009 | Ziegler | G06T 11/006 378/4 |
| 8,917,284 | B2* | 12/2014 | Finch | G06T 11/203 345/442 |
| 9,031,299 | B2* | 5/2015 | Brown | G06T 5/001 348/335 |
| 2003/0076988 | A1* | 4/2003 | Liang | G06T 5/10 382/131 |
| 2003/0156684 | A1* | 8/2003 | Fessler | A61B 6/032 378/210 |
| 2003/0219152 | A1* | 11/2003 | August | G06T 11/005 382/131 |
| 2004/0258202 | A1* | 12/2004 | Wernick | A61B 6/483 378/70 |
| 2005/0259889 | A1* | 11/2005 | Ferrari | G06K 9/40 382/275 |
| 2007/0018108 | A1* | 1/2007 | Kitamura | G01T 1/2985 250/363.02 |
| 2008/0118128 | A1* | 5/2008 | Toth | G06T 11/003 382/131 |
| 2011/0043603 | A1* | 2/2011 | Schechner | G06T 5/003 348/25 |
| 2012/0170805 | A1* | 7/2012 | Brown | G06K 9/00778 382/103 |
| 2012/0281896 | A1* | 11/2012 | Aspelmeier | G06T 11/006 382/131 |

OTHER PUBLICATIONS

Lefkimmiatis, S. "Poisson Image Reconstruction with Hessian Schatten-Norm Regularization" Trans Image Process. IEEE Trans Image Process Nov. 3, 2013;22(11):4314-27.*

Bechler, et al., "Greedy Wavelet Projections Are Bounded on BV," Transactions of the American Mathematical Society, vol. 359, No. 2, Feb. 2007, pp. 619-635.

Candes, et al., "An Introduction to Compressive Sampling," IEEE Signal Processing Magazine, Mar. 2008, pp. 21-30.

Candes, et al., "Sparsity and Incoherence in Compressive Sampling," Inverse Problems, vol. 23, 2007, p. 969-985.

Cohen, et al., "Nonlinear Approximation and the Space BV (R2)," American Journal of Mathematics, vol. 121, 1999 pp. 587-628.

Craig, Cecil, "On the Tchebychef Inequality of Bernstein," The Annals of Mathematical Statistics, vol. 4, No. 2, 1933, pp. 94-102.

Donoho, David L., "For Most Large Underdetermined Systems of Linear Equations, the Minimal l1-norm Solution is Also the Sparsest Solution," Communications on Pure and Applied Mathematics, vol. LIX, 2006, pp. 797-829.

Donoho, David L., "For Most Large Undedetermined Systems of Linear Equations, the Minimal l1-norm Near-Solution Approximates the Sparsest Near-Solution," Communications on Pure and Applied Mathematics, vol. LIX, 2006, pp. 907-934.

Harmany, et al., "Sparse Poisson Intensity Reconstruction Algorithms," 2009 IEEE/SP 15th Workshop on Statistical Signal Processing, Piscataway, NJ, Aug. 2009, pp. 634-637.

Haupt, et al., "Signal Reconstruction From Noisy Random Projections," IEEE Transactions on Information Theory, vol. 52, No. 9, 2006, pp. 4036-4048.

Lingenfelter, et al., "Sparsity Regularization for Image Reconstruction with Poisson Data," Proceedings of the SPIE—IS&T Electronic Imaging, SPIE vol. 7246, Jan. 19, 2009, 10 pages.

Noras, J.M., "Some Formulas for Moments of the Poisson Distribution," Physical Review B, vol. 22, No. 12, Dec. 15, 1980, pp. 6474-6475.

Panin, Y.V., "Regularization Methods in Iterative Algorithms for Variance Reduction on Compressed Sinogram Random Coincidences," 2009 IEEE Nuclear Science Symposium and Medical Imaging Conference (NSS/MIC 2009), Orlando, FL, Piscataway, NJ, Oct. 24, 2009, pp. 2834-2838.

Raginsky, et al., "Compressed Sensing Performance Bounds Under Poisson Noise," IEEE Trans. on Signal Processing, vol. 58, No. 8, 2010, pp. 1-12.

Sardy, et al., "Automatic Smoothing With Wavelets for a Wide Class of Distributions," Journal of Computational and Graphical Statistics, vol. 13, No. 2, pp. 1-23.

Shaked, et al., "Iterative Shrinkage Approach to Restoration of Optical Imagery," IEEE Transactions on Image Processing, vol. 20, No. 2, Feb. 2011, pp. 405-416.

Starck, et al., "An Overview of Inverse Problem Regularization Using Sparsity," Image Processing (ICIP), 16th IEEE International Conference, Piscataway, NJ, Nov. 7, 2009, 4 pages.

Willett, et al., "Poisson Image Reconstruction With Total Variation Regularization," 2010 17th IEEE International Conference on Image Processing (ICIP), Sep. 2010, 4 pages.

Willett, et al., "Performance Bounds on Compressed Sensing With Poisson Noise," Information Theory, 2009. ISIT 2009. IEEE International Symposium on, IEEE, Piscataway, NJ, USA, Jun. 28, 2009, pp. 174-178.

Zhang, et al., "A Novel Sparsity Reconstruction Method From Poisson Data for 3D Bioluminescence Tomography;", Journal of Scientific Computing, vol. 50, 2012, pp. 519-535.

* cited by examiner

TRANSMISSION IMAGE RECONSTRUCTION AND IMAGING USING POISSONIAN DETECTOR DATA

CROSS-REFERENCE TO RELATED APPLICATIONS

This national stage application claims the benefit under 35 U.S.C. §371 of International Application No. PCT/EP2011/003507 filed on Jul. 13, 2011, entitled TRANSMISSION IMAGE RECONSTRUCTION AND IMAGING USING POISSONIAN DETECTOR DATA, whose entire disclosures are incorporated by reference herein.

ACKNOWLEDGEMENT OF GOVERNMENT SUPPORT

The work leading to this invention has received funding from the European Atomic Energy Community's Seventh Framework Program ([FP7/2007-2011]) under grant agreement no FP7-212100.

FIELD OF THE INVENTION

The invention relates to an image reconstruction method for reconstructing an image of an object based on detector data contaminated with Poisson noise, especially detector data collected with an X-ray transmission device, like a computed tomography (CT) imaging device or a planar X-ray imaging device, operating e.g. under low photon-flux conditions. In particular, the image reconstruction method is based on a non-analytical image reconstruction using a minimizing algorithm. Furthermore, the invention relates to an imaging method including the image reconstruction method. Furthermore, the invention relates to an imaging device implementing the imaging and image reconstruction methods.

BACKGROUND OF THE INVENTION

In the present specification, reference is made to the following publications illustrating prior art of conventional image reconstruction and imaging techniques.

[1] David Donoho. For most large underdetermined systems of linear equations, the minimal $1^1$ norm near-solution approximates the sparsest near-solution. *Communications on Pure and Applied Mathematics*, 59(7):907-934, 2006;

[2] Jarvis Haupt and Robert Nowak. Signal reconstruction from noisy random projections. *IEEE Trans. on Information Theory*, 52(9):4036-4048, 2006;

[3] Maxim Raginsky, Rebecca M. Willett, Zachary T. Harmany, and Roummel F. Marcia. Compressed sensing performance bounds under poisson noise. *IEEE Trans. on Signal Processing*, 58(8):3990-4002, 2010;

[4] Emmanuel Candès and Justin Romberg. Sparsity and incoherence in compressive sampling. *Inverse Problems*, 23(3):969-985, 2007;

[5] C. C. Craig. On the Tchebychef inequality of Bernstein. *Ann. Math. Statist.*, 4(2):94-102, 1933;

[6] J. M. Noras. Some formulas for moments of the Poisson distribution. *Phys. Rev. B*, 22(12):6474-6475, 1980;

[7] Emmanuel J. Candès et al. "An Introduction To Compressive Sampling" in "IEEE Signal Processing Magazine" March 2008, p. 21-30; and

[8] Rebecca M. Willett et al. "Performance bounds on compressed sensing with Poisson noise" in "IEEE International Symposium on Information Theory ISIT" 2009, Jun. 28, 2009-Jul. 3, 2009, p. 174-178; and

[9] PCT/EP2010/000526 (not published at the priority date of the present specification).

The reconstruction of a three-dimensional CT image is often accomplished by the well-known filtered back projection (FBP) algorithm, which is well suited for conventional CT imaging. However, this algorithm has some drawbacks. First, it requires an ideal measurement, i.e. the angles under which the patient is viewed must be many, and they should be equidistant. Second, the FPB does not work easily with noise. The latter means that the image acquisition must be done in such a way as to minimize noise, which requires a high dose. An alternative to FBP is to reconstruct the image iteratively using standard techniques such as Maximum Likelihood Expectation Maximization (MLEM). This method has the advantage that the imaging setup is in principle relatively arbitrary: for example, angles do not have to be equidistant (although they often are). Furthermore, the Poissonian nature of the noisy measurements is built into the method. This type of algorithm is becoming more and more feasible with the amount of computer power currently available. Nevertheless, it is still necessary to record a lot of information in order to obtain a good reconstruction in the end.

In contrast to this, the concept of compressive sensing (CS) promises, in principle, that a similarly good reconstruction can be obtained with significantly less recorded information. It relies on the idea that most, if not all, real world objects are "compressible" if they are represented in a suitable basis system. Compressible means that the coefficients of the representation, when ordered by size, fall off fast with some power of their index. The information that an object is compressible can be used in addition to the relatively few recorded data points to obtain a reliable reconstruction. With more details, compressed sensing (or: compressive sensing, compressive sampling and sparse sampling), is a technique for acquiring and reconstructing a signal utilizing the prior knowledge that it is sparse or compressible. An introduction to CS has been presented by Emmanuel J. Candès et al. [7]. The CS theory shows that sparse signals, which contain much less information than could maximally be encoded with the same number of data entries, can be reconstructed exactly from very few measurements in noise free conditions.

According to Jarvis Haupt et al. [2], a set of data $f^*_j$ of size v (j=1, ..., v) which is sparse (or rather "compressible") can be accurately reconstructed from a small number k of random projections even if the projections are contaminated by noise of constant variance, e.g. Gaussian noise. Specifically, $y_i = \Sigma_j \phi_{ij} f^*_j + \xi_i$ with i=1, ..., k are the noisy projections of $f^*_j$, taken with the projection matrix $\phi_{ij}$ which consists of random entries all drawn from the same probability distribution with zero mean and variance 1/v (such that the transformed values $y_i$ have the same order of magnitude than the original ones) and the noise $\xi_i$ is drawn from a Gaussian probability distribution with zero mean and variance $\sigma^2$. By finding the minimizer $\hat{f}_j$ of a certain functional (to be shown in detail below), one obtains an approximation to $f^*_j$ for which the average error is bounded by a constant times $(k/\log v)^{-a}$ with $0 < a \leq 1$, i.e. the error made depends only logarithmically on v. To put it another way, the error can be made small by choosing k/log v large, but it is by no means necessary to have k/v close to 1. Accurate reconstruction is possible even if the number of projections is much smaller than v, as long as k/log v is large.

A crucial point in the derivation of the above result is the fact that the variance of the noise $\xi_i$ is a constant. Even though a similar result could be obtained for non-Gaussian noises (provided certain noise properties required for the validity of the Craig-Bernstein inequality can be proved), the result does not easily carry over to the case that the variance of the noise depends on the values f*_j. Yet this is precisely what happens e.g. in photon limited imaging systems where a main source of noise is the discrete quantum nature of the photons. In this case the projections $y_i$ have Poisson statistics with parameter $\mu_i = \Sigma_j \phi_{ij} f^*_j$. This parameter is equal to the mean of $y_i$ but also to its variance.

In the past, it was tested whether the principle of accurate reconstructions from few projections carries over to Poisson noise in order to make accurate reconstructions possible with fewer measurements, e.g. in emission tomography. It was expected that the compressive sensing strategy for the reconstruction of sparse or compressible objects from few measurements is difficult to apply to data corrupted with Poisson noise, due to the specific properties of Poisson statistics and the fact that measurements can not usually be made randomly, as in many other cases.

Rebecca M. Willett et al. [8] have generalized results from Jarvis Haupt et al. to Poisson noise. It was proposed to reconstruct a tomographic image from detector data using a procedure of minimizing a functional f̂ depending on a sensing matrix A and the detector data and further depending on a penalty term, wherein the sensing matrix A is constructed on the basis of statistic Rademacher variables and the penalty term depends on the sparsity of the object. However, the result was discouraging: it was found that the upper bound on the error increases with the number of measurements, i.e. more measurements seem to make the accuracy smaller. Thus, it was assumed that compressive sensing ordinarily only works with noise types which have a fixed variance.

An image reconstruction method is proposed in [9] for reconstructing an emission tomographic image of a region of investigation within an object from detector data comprising Poisson random values measured at a plurality of different positions relative to the object. The positions are the spatial locations of measuring the detector data, e.g. the position of a detector element (pixel) of a SPECT detector device at the time of collecting data with this detector device under its current angular position with respect to the object and under its distance from the centre of rotation, or as a further example, spatial locations of detector elements sensing data at the lines of response (LOR's) of coincidence events measured with a PET detector device. According to [9], a predetermined system matrix assigning the voxels of the object to the detector data is provided. Furthermore, the tomographic image is reconstructed by minimizing a functional depending on the detector data and the system matrix and additionally including a sparse or compressive representation of the object in an orthogonal basis. The orthogonal basis is an orthogonal matrix, the columns of which are orthonormal basis vectors. The orthobasis is selected such that the object, in particular the region of investigation, can be represented in the orthobasis fulfilling the requirements of sparsity or compressibility. Contrary to the above approach of Rebecca M. Willett et al. [8] using a random sensing matrix, elements of the system matrix are not statistic values but rather selected by geometrically or physically assigning contributions of each of the voxels (object data) to each detector element of a detector device or the associated detector data, resp. The system matrix which defines the detector data as linear combinations of the original object data is determined by geometric or physical features of the imaging device, in particular by the arrangement of the object relative to the detector device and the detector device geometry.

OBJECTIVE OF THE INVENTION

The objective of the invention is to provide an improved image reconstruction method for reconstructing an image of an object, in particular for transmission tomography purposes, which is capable of avoiding disadvantages of conventional techniques. In particular, the objective is to provide an image reconstruction method which enables reconstructing the transmission image with a reduced quantity of detector data (such as for instance fewer angles for CT or super-sampling for planar X-ray images) without a loss in image quality. Furthermore, the objective of the invention is to provide an improved imaging method avoiding disadvantages of conventional imaging techniques. Furthermore, the objective of the invention is to provide an improved imaging device in particular being adapted for conducting the inventive imaging method.

SUMMARY OF THE INVENTION

The above objectives are solved by an image reconstruction method, an imaging method and/or an imaging device comprising the features of the independent claims. Advantageous embodiments of the invention are defined in the dependent claims.

According to a first aspect of the invention, an image reconstruction method is proposed for reconstructing an image $\underline{f}^{min}$ representing a region of investigation within an object. Firstly, detector data ($y_i$) are provided which comprise Poisson random values from an X-ray transmission measurement using an X-ray source and a detector device, said detector data ($y_i$) being measured at an i-th of a plurality of different pixel positions of the detector device relative to the object. Subsequently, the image $\underline{f}^{min}$ is reconstructed based on the detector data ($y_i$) using a procedure of minimizing the functional $F(\underline{f})$ $$F(\underline{f}) = \frac{1}{k}\sum_{i=1}^{k}(\mu_i - y_i \log \mu_i) + a|T^{-1}\underline{f}|_p$$

wherein $\underline{f}$ is a current test image used for minimizing the functional $F(\underline{f})$, $$\frac{1}{k}\sum_{i=1}^{k}(\mu_i - y_i \log \mu_i)$$

is a maximum-likelihood risk functional for Poisson statistics, said parameters $\mu_i$ being transmission projections of the test image $\underline{f}$, said projections being computed according to Beer-Lambert's law at the i-th pixel position relative to the X-ray source, $|T^{-1}\underline{f}|_p$ is a sparsity enforcing functional including the $l_p$ norm of vector $T^{-1}\underline{f}$ with $0 \leq p < 2$, said vector $T^{-1}\underline{f}$ being a sparse or compressive representation of $\underline{f}$ in a (bi-) orthogonal basis T, and a is a calibration factor. The image $\underline{f}^{min}$ to be reconstructed is the global minimum of the functional $F(\underline{f})$.

The inventors have found that for the reconstruction of X-ray transmission images, the functional to be minimized for finding the reconstructed image, is defined depending on the Beer-Lambert's law (or: Beer's law). The Beer-Lambert's law states that the total attenuation is equal to the exponential of the negative integral of the local attenuation coefficients over the radiation path through the object. Accordingly, there is a logarithmic dependency between the transmission of radiation through the object and the product of the local attenuation coefficient of the object and the distance the radiation travels through a volume element, summed over the volume elements along the path.

The inventors have shown that the image reconstruction works with Poissonian noise, which does not have a fixed variance (the variance of a Poisson variable x with average value $Ex=\lambda$ is equal to $E(x^2)-E^2(x)=\lambda$ and thus signal dependent). The invention thus allows for reducing the number of angles and dose by making use of the compressive nature of the object (the patient) and by modelling and incorporating the noisy nature of the measurements, resulting in an accurate reconstruction with a high signal to noise ratio.

Optionally, the functional $F(\underline{f})$ additionally can include an additive regularization function $R(\underline{f})$:

$$F(\underline{f}) = \frac{1}{k}\sum_{i=1}^{k}(\mu_i - y_i\log\mu_i) + a|T^{-1}\underline{f}|_p + R(\underline{f}).$$

As an advantage, the regularization function R can be constructed for suppressing artefacts in the reconstructed tomographic image.

As a main advantage, the invention provides a new method to accurately reconstruct a three or two dimensional image from very few detector data, e.g. projections, by non-analytical or algebraic methods using a minimizing algorithm. The inventors have found methods of exploiting the fact that real world objects are usually sparse or at least compressible while overcoming the restrictions of conventional approaches for applying CS on Poisson noise data. X-ray transmission images can be reconstructed with a number of measurements which is reduced compared with conventional measurements, whereas the same accuracy as with conventional methods can be obtained. Accordingly measurement time and/or applied activity (for emission tomography) or irradiation dose (for transmission tomography) can thus be reduced.

For conventional reconstructions there are (at least) three problems. First, the data are noisy, second, it is necessary to perform a large number of measurements in order to obtain sufficient information for an acceptable reconstruction quality and third, the reconstruction problem is ill-posed such that without further measures even an infinitesimal amount of noise generates serious artifacts. The invention is capable of overcoming all three difficulties by providing a link between a compressive sensing strategy (solving problem two) and a maximum likelihood approach (which deals optimally with problem one) for the case of Poisson noise, while still allowing for inclusion of regularization techniques addressing problem three.

According to the invention, the image $\underline{f}^{min}$ is reconstructed by minimizing the functional in particular including a sparse or compressive representation of the object in a (bi-) orthogonal basis T. The (bi-)orthogonal basis (or simply basis in the following) T is a (bi-) orthogonal matrix, the columns of which are basis vectors. The basis is selected such that the object, in particular the region of investigation, can be represented in the basis fulfilling the requirements of sparsity or compressibility.

The minimizing procedure is a non-analytical or algebraic procedure, e.g. an iterative algorithm. The reconstructed image $\underline{f}^{min}$ comprises the image data representing the global minimum of the functional $F(\underline{f})$. In particular, the inventive reconstruction comprises minimizing the above functional $F(\underline{f})$, which includes two or optionally three additive parts, namely an empiric risk part, which represents the Poisson statistic of the measurement, a CS part representing the compressibility of the object and (optionally) a regularization term.

The calibration factor a is a predetermined fixed parameter, which is not changed during the minimization procedure, i.e. it is not a fit parameter. Further features of the calibration factor a are described below. By a preliminary determination of the calibration factor a, the image reconstruction can be improved. This is a further difference compared with the above conventional approach of Rebecca M. Willett et al.

According to a first preferred embodiment of the invention (CT embodiment), the X-ray transmission measurement is an X-ray CT imaging of the object and the image $(f_j^{min})$ is a volumetric (two-dimensional slices or a three-dimensional volume) reconstruction of the object. Using the Beer-Lambert's law, the parameters $\mu_i$ are $$\mu_i = \Sigma_i B'_{ii'} I_0 \exp(-\Sigma_j A_{i'j} f_j) + r$$

wherein $B'_{ii'}$ is a matrix representing a response function of the detector device assigning an i'-th spatial position on the detector surface to the i-th detector data $(y_i)$, $I_0$ is an intensity of the unattenuated X ray beam, $A_{i'j}$ is a predetermined system matrix assigning a j-th voxel of the object (1) to the i'-th spatial position on the detector surface, and r is a background count parameter of the detector device.

With the CT embodiment, the predetermined system matrix $A_{ij}$ assigning a j-th voxel of the object to the i'-th detector data is provided. Contrary to the above conventional approach of Rebecca M. Willett et al. using a random sensing matrix, elements of the system matrix $A_{ij}$ are not statistic values but rather selected by geometrically or physically assigning contributions of each of the voxels (object data) to each detector element of a detector device or the associated detector data, resp. The system matrix which defines the detector data as linear combinations of the original object data is determined by geometric or physical features of the imaging device, in particular by the arrangement of the object relative to the detector device and the detector device geometry. In addition, influences such as focal spot size, heel effect or body scatter may be encoded in the system matrix.

The basis T is selected to be as incoherent as possible with respect to the system matrix $A_{ij}$ and such that the object $\underline{f}$ (or a comparable typical object) has a compressible representation in this basis. These criteria were introduced previously e.g. by J. Candès et al. (see above). A particular advantage of this embodiment, which is explained with further details below, can be obtained by the application of the $l_p$ norm with $0 \leq p < 2$, e.g. $p=1$. In the case $p \geq 1$, the minimization procedure has a single global minimum allowing an implementation with an increased processing speed.

According to a second preferred embodiment of the invention (planar imaging embodiment), the X-ray transmission measurement is a planar X-ray imaging of the object and the image $(f_{i'}^{min})$ is a planar reconstruction of an X-ray attenuation image of the object. Using the Beer-Lambert's law, the test image $f_{i'}$ is given in terms of a three dimensional test object $f_j^A$ as $$f_{i'} = I_0 \exp(-\Sigma_j A_{i'j} f_j^A),$$

$A_{i'j}$ is a predetermined system matrix assigning a j-th voxel of the test object to the i'-th spatial position on the detector surface, and the parameters $\mu_i$ are $$\mu_i = \Sigma_i B'_{ii'} f_{i'} + r.$$

wherein $B'_{ii'}$ is a matrix representing a response function of the detector device assigning an i'-th spatial position on the detector surface to the i-th detector data ($y_i$), and r is a background count parameter of the detector device.

A further advantage of the invention is given by the fact that various approaches for determining (adjusting) the system matrix $A_{ij}$ and/or the response function $B'_{ii'}$ are available. As a first variant, the system matrix and/or the response function can be adjusted using reference data of the measuring system used for collecting the detector data. The reference data can be stored as specific data of the measuring system in the image reconstruction device, e.g. in the imaging device. According to a second variant, the entries of the system matrix and/or of the response function can be acquired using a calibration measurement. In this case, collecting the detector data is performed with a calibration object (phantom) having known volumetric or planar transmission object data. The calibration detector data can be used for adjusting the elements of the system matrix and/or of the response function.

Another advantage of the invention is given by the fact that various bases T are available. As it is known from the theory of three-dimensional wavelets (see A. Cohen et al. in "American Journal of Mathematics", Volume 121, 1999, p. 587-628, and P. Bechler et al. in "Transactions of American Mathematical Society", Volume 359 (2), 2007, p. 619-635), objects with so-called bounded variation have compressible wavelet coefficients. This condition is indeed fulfilled for the objects of the real world, so that a suitable orthobasis using three-dimensional wavelets with a finite support can be found for any object to be investigated. Therefore, according to a referred embodiment of the invention, T is a basis of three-dimensional wavelets with a compact carrier. Alternatively, if a certain prior knowledge is available about the object or the structure thereof, an adapted basis can be constructed with entries depending on typical object data of the object to be imaged. In this case, the orthobasis can be matched to the type of object for improving the image reconstruction. As an example, if it is known that the object is sufficiently smooth, it will have predominantly low spatial frequency components such that a Fourier basis is adequate. Alternatively, one could choose a basis of Chebyshev polynomials in the plane combined with a one dimensional Fourier basis in the axial direction. For real world objects a principal components analysis of a number of reference objects may generate a suitable basis.

The image reconstruction method can be conducted immediately after collecting the detector data, in particular with the imaging device collecting the detector data. Alternatively, the image reconstruction method can be conducted with an image reconstruction device at a distant location and/or with a delay after the measurement with detector data provided e.g. via a data communication channel from the imaging device to the image reconstruction device or from a data storage. Accordingly, the detector data can be provided e.g. via a data network, from a data storage or directly by the detector device.

Further important features of the invention may be represented by additional steps conducted after the image reconstruction, like e.g. storing, recording, displaying and/or further image processing of the reconstructed image.

According to a second aspect of the invention, an imaging method for reconstructing an image of a region of investigation within an object is proposed, which comprises the steps of collecting the detector data with the detector device of an imaging device and subjecting the detector data to the inventive image reconstruction method according to the above first aspect of the invention. Preferably, the imaging method is adapted for collecting a CT image or a planar transmission image.

According to a further, particularly preferred embodiment of the invention, a preparation step can be provided before the collection of the CT detector data. The preparation step comprises a setting of an image quality measure (risk) to be fulfilled by the imaging method. Depending on the risk, the dose and the number of angular positions are selected at which detector data are collected. Accordingly, for obtaining a preview image wherein a low image quality is sufficient, a reduced number of angular positions is used, while for a subsequent regular imaging with improved image quality, the dose and/or the number of angular positions (and correspondingly detector data) is increased.

According to a third aspect of the invention, an imaging device for imaging a region of investigation in an object is proposed, which comprises an X-ray source, a detector device for measuring detector data comprising Poisson random values measured at the i-th angular position of a detector element of the detector device relative to the object, and a reconstruction device for reconstructing an image the object, wherein the detector data are subjected to the image reconstruction method according to the above first aspect of the invention.

Further independent subjects of the invention are a computer program residing on a computer-readable medium, with a program code for carrying out the image reconstruction method according to the above first aspect of the invention, and an apparatus comprising a computer-readable storage medium containing program instructions for carrying out the image reconstruction method according to the above first aspect of the invention.

Further advantages of the invention can be summarized as follows. First, the quantity of measurements for obtaining a certain image quality can be reduced compared with the conventional imaging technique yielding the same image quality. The measuring time and the burden for the patient can be reduced accordingly. In particular, artefacts resulting from unintended movements of the object, e.g. of the patient, can be avoided. Second, the image reconstruction method does not include a free parameter. In particular, if sufficient information is available as to the compressibility of the object data, the X-ray transmission image can be obtained exclusively on the basis of the detector data and the system matrix determined by the measuring arrangement. Third, the reconstruction risk (see below) can be controlled. The quality of a reconstruction can be quantitatively evaluated. The image reconstruction method considers Poisson statistics not only in the evaluation of the risk, but rather also with the reconstruction as such, i.e. the advantages of the maximum-likelihood reconstruction are associated with the advantage of a reduced number of measurements due to applying the CS technique. Fourth, instead of only reducing the number of measurements an appropriate combination of reduced measurements and reduced dose may be chosen which maintains the same risk. Finally, the inventive method can be extended in analogy to the penalized-likelihood method for a regularization of the reconstructed object.

The invention provides further particular advantages for the imaging method, in particular for selecting or setting the angular positions at which the detector data are collected. According to a preferred embodiment of the invention, a randomized setting of the angular positions can be provided. According to a further, alternative embodiment of the invention, the detector data can be continuously collected, e.g. with a CT device while the angular positions of the detector device thereof are changed continuously and not in the usual step-and-shoot mode. Accordingly, the imaging speed can be essentially increased.

BRIEF DESCRIPTION OF THE DRAWINGS

Further details and advantages of the invention are described in the following with reference to the attached drawings, which show in.

DESCRIPTION OF PREFERRED EMBODIMENTS

Preferred embodiments of the invention are described here with exemplary reference to transmission tomography, in particular CT, and planar imaging. Details of measuring techniques, like e.g. details of CT or other X-ray transmission imaging devices and modes of operating those devices are not described as far as they are known from conventional techniques. Furthermore, the invention is not restricted to medical imaging, but rather can also be implemented for imaging other objects, like e.g. work pieces.

Embodiments of the invention are described in the following with reference to the procedural steps of the inventive methods. Implementing these features as data processing tools applied to raw data obtained with a measuring system (imaging device) will depend on e.g. the measuring system used and the type of object to be imaged in practice. While the understanding and the implementation of the features is based on the mathematical background outlined below, the skilled person will recognize that the invention is not restricted to each mathematical detail, but covers all data processing tools generally based on this mathematical background.

1. Imaging Device

Figure 1:
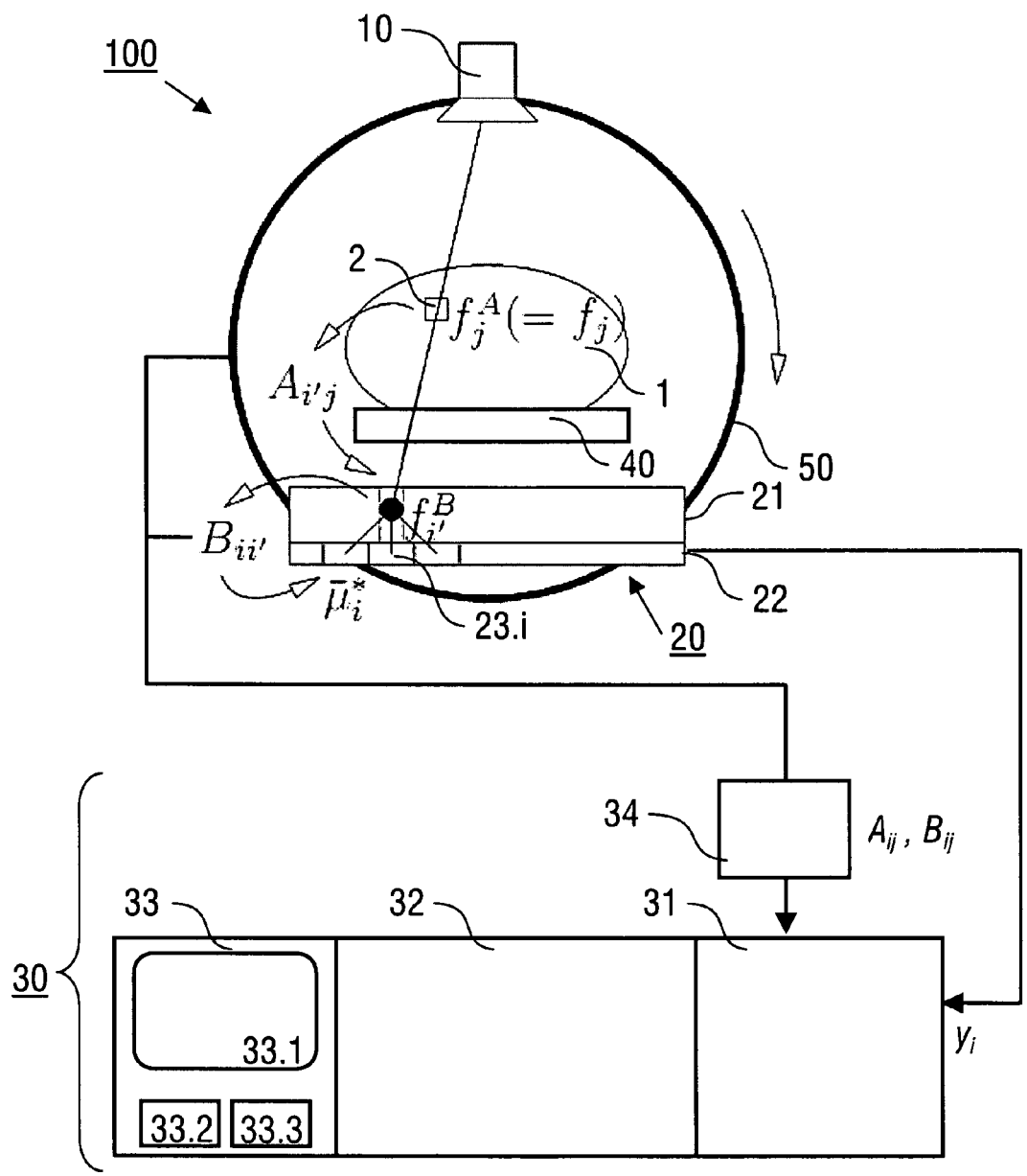
FIGS. 1 and 2: schematic representations of imaging devices embodying the present invention.

FIG. 1 schematically illustrates a schematic view of the first embodiment (CT embodiment) of an imaging device 100 including an X-ray source 10, a detector device 20, a reconstruction device 30, an object carrier 40, and a carrier of the source and the detector 50. The components 10, 20, 40 and 50 are structured like in a conventional CT device of any generation. In particular, the detector device 20 comprises a conversion layer 21 for converting X-ray radiation into optical radiation and a detection layer 22 with an array of detector elements 23.$i$ ($i=1, 2, 3, \ldots$), which are arranged in a one- or, more commonly, two-dimensional geometry (such as a line-shaped or matrix-shaped array, or a plane or curved array). The detector design shown here is only for illustration; other designs (e.g., detectors with a curved surface) are possible. The source and detector carrier 50 is rotatably mounted such that it can be rotated in an x-y-plane (drawing plane) around the object carrier 40. The object carrier 40 is a support device, e.g. table, configured for accommodating the object 1, e.g. a patient to be investigated. As an example, the object carrier 40 comprises a carrying bed for accommodating the patient as schematically illustrated in FIG. 1. The source and detector carrier 50 comprises e.g. a circular rail to which the X-ray source 10 and the detector device 20 are attached. The object carrier 40 and the detector carrier 50 can be translated relative to each other in a direction perpendicular to the x-y-plane.

The object 1 is e.g. a human patient, wherein a certain portion (region of investigation), e.g. the brain is to be investigated with the inventive imaging method. In terms of the imaging and image reconstruction methods, the region of investigation is considered as consisting of a plurality of voxels 2. The j-th voxel 2 is schematically shown for illustrative purposes.

The reconstruction device 30 comprises an input circuit 31, a processing circuit 32, an output circuit 33, and an entry storage 34. The input circuit 31 is arranged for receiving the detector data (raw data) and further entries, which are used for implementing the inventive image reconstruction method. To this end, the detector device 20 is connected with the input circuit 31 for transferring detector data $y_i$ and the associated geometrical parameters such as the table feed or the angular position $\alpha_l$. Furthermore, the input circuit 31 is connected with the entry storage 34 being arranged for storing the system matrix $A_{ij}$, the basis T and optionally a regularization function R. The processing circuit 32 includes a computer unit, which is configured for implementing the data processing of the image reconstruction method. Finally, the output circuit 33 may comprise a display 33.1, a data storage 33.2 and/or an interface 33.3. In particular, the output circuit 33 may include a Dicom-node. The reconstruction device 30 can be implemented with a standard computer having an appropriate hardware configuration, preferably including a GPU acceleration.

FIG. 1 schematically illustrates the imaging process. The attenuation coefficient at voxel j, $f_j^A$, contributes with an attenuation factor of $e^{-A_{i'j}f_j^A}$ to the average signal $f_{i'}^B$ arriving at position i' of the conversion layer, see Eq. (1) below. This ideal signal is further modified by the response function (modeled by a matrix $B_{ii'}$) of the detector system, i.e. the signal $f_{i'}^B$ at i' adds the amount $B_{ii'}f_{i'}^B$ to the actual average signal $\bar{\mu}^*_i$ finally recorded at detector pixel i (Eq. (2) below). For CT, the tube and the detector are rotated around the patient and images are taken for many angles.

Figure 2:
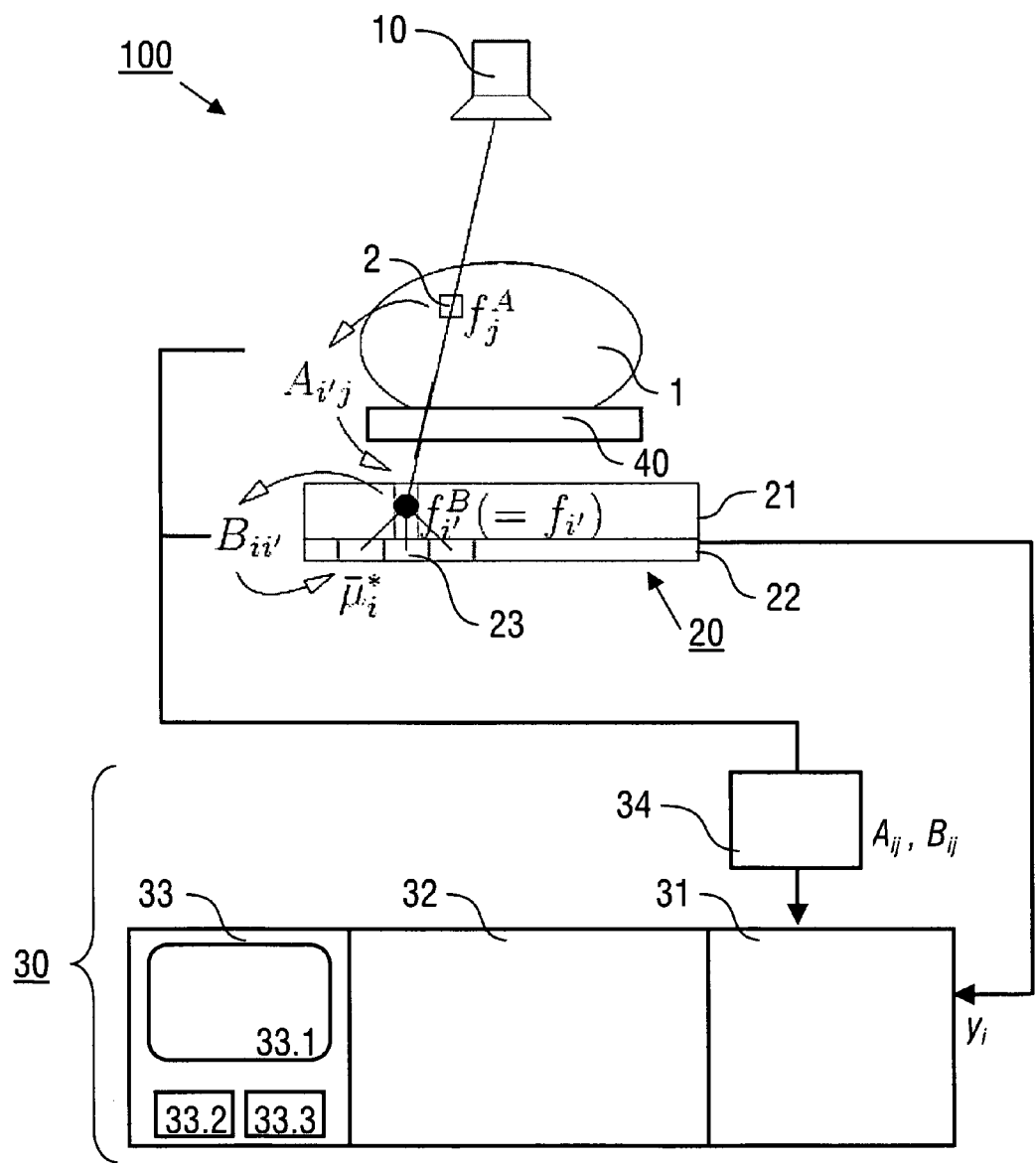

FIG. 2 illustrates a schematic view of the second embodiment (planar imaging embodiment) of an imaging device 100 including an X-ray source 10, a detector device 20, a reconstruction device 30, and an object carrier 40. For planar X-ray imaging, the imaging process is similar to FIG. 1 but there is only one image being taken and the tube and detector are not rotated around the object 1.

2. Image Reconstruction and Imaging Methods

With the situation depicted in FIGS. 1 and 2, one has a (three dimensional) attenuation map $f_j^A$ (the subscript j indexes the voxels, of which there are $v_A$) which is projected through X-ray projections of the form $$f_{i'}^B = I_0 \exp\left(-\sum_j A_{i'j} f_j^A\right) \tag{1}$$

onto $v_B$ spatial positions on the conversion layer 21, where $I_0$ is proportional to the intensity of the unattenuated X-ray beam and $A_{ij}$ is the $v_B \times v_A$ system matrix, for example the discretized integral kernel of the Radon transform. Both the attenuation coefficients $f_j^A$ and the entries of the system matrix $A_{ij}$ are nonnegative on physical grounds, and naturally the $f_{i'}^B$ are nonnegative as well. However, the detection layer 22 does not measure these projections directly. First, the detector itself has a response function which is modelled by a $n \times v_B$ matrix B. It can be thought of as the point spread function (PSF) of the detector but can also contain other (linear) characteristics. It is, however, required that $B_{ii'} \geq 0$ for all i,i'. In addition, in practice there is always a background count rate $r > 0$. Hence the average detector signal is given by $$\overline{\mu}_i^* = \sum_{ii'} B_{ii'} f_{i'}^B + r. \quad (2)$$

Yet even these projections $\overline{\mu}^*_i$ are not directly observed, but they act as the parameter of a Poisson process, i.e. one measures a number $y_i$ of quanta (γ photons, for instance) drawn from a Poisson distribution $$P(y_i) = e^{-\overline{\mu}_i^*} \frac{(\overline{\mu}_i^*)^{y_i}}{y_i!}.$$

From these measurements $y_i$ the original object $f_j^A$ is to be reconstructed as accurately as possible from as few projections as possible. This is the situation usually seen in CT. Note that for CT, the patient is viewed from many angles and thus the index i (and likewise i') is in fact a double index i=(k,α) where k indexes the spatial position of the pixels on the detector and α indexes the angles.

Although the main focus is CT (FIG. 1), with a slight modification the invention is also applicable to planar images (FIG. 2). Such planar images could result from a single X-ray exposure but also, for instance, from whole body planar nuclear medicine measurements. The only difference is that for planar images one is not interested in the full three-dimensional information $f_j^A$ but only in the ideal planar projections $f_{i'}^B$, i.e. one would only like to improve the images by eliminating the detector response and Poisson noise, and/or for example by attempting to achieve superresolution. This difference between three-dimensional and planar reconstruction will have some consequences in the following.

The main result of this invention is that an accurate reconstruction of noisy Poisson data with few measurements can be achieved by minimizing a certain functional shown below. "Few" measurements here means that of the n measurements the system is in principle able to make (n can be thought of as the amount of pixels measured by a conventional CT) only k are actually being made, with k<<n, thus saving time and dose. It is assumed (and it is reasonable to assume) that the object being reconstructed is compressible in some orthogonal or biorthogonal basis, here denoted by a (bi-) orthogonal matrix $T^{-1}$. This could be a wavelet basis, or some other, more problem specific basis. The reconstruction is done by finding the minimizer $\underline{f}$ of the functional $$F(\underline{f}) = \frac{1}{k} \sum_{i=1}^{k} (\mu_i - y_i \log \mu_i) + a|T^{-1} \underline{f}|_p \quad (3)$$

(cf. Eq. (18) below) with (using the notation $\underline{f}$ instead of $\underline{f}^A$ for convenience)

$$\mu_i = \sum_{i'} B'_{ii'} I_0 \exp\left(-\sum_j A_{i'j} f_j\right) + r \quad (4)$$

in case of a CT reconstruction (FIG. 1) and, in case of planar images (FIG. 2), $$\mu_i = \sum_{i'} B'_{ii'} f_{i'} + r, \quad (5)$$

this time writing $\underline{f}$ instead of $\underline{f}^B$. The sum in Eq. (3) goes over the k pixels actually measured, and the $y_i$ are the measured Poisson values. Correspondingly, the matrix B' is equal to the full matrix B restricted to the pixels measured.

This result is shown for the p-norm $|\ldots|_p$ with p=0 but can be extended to the convex case p=1 based on [1] and, on similar grounds, to other sparsity-enforcing norms with 0≤p<2. The prefactor a is known for p=0 and can be chosen empirically or self-consistently for other values of p.

Figure 3:
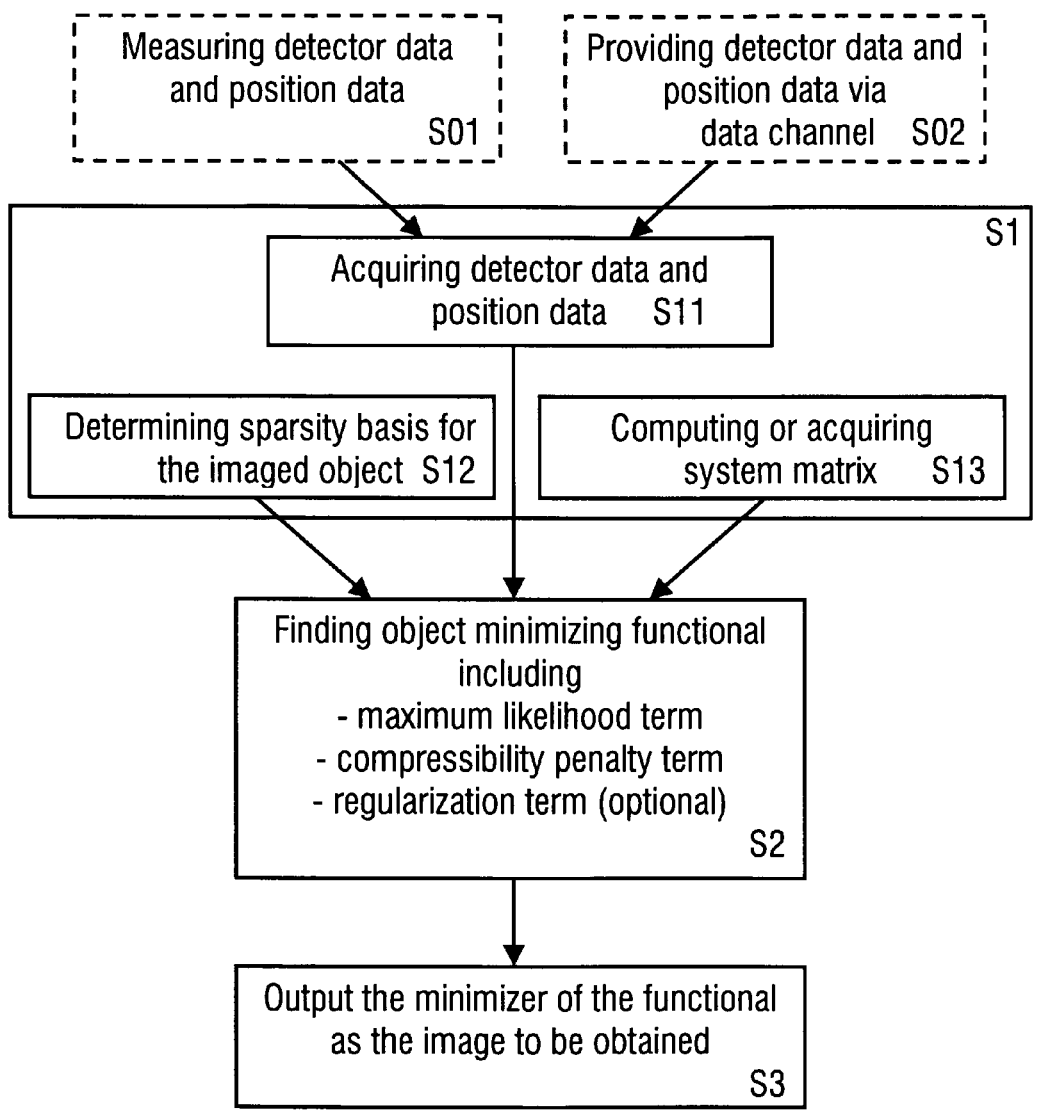
FIG. 3: a schematic flowchart illustrating embodiments of the inventive image reconstruction and imaging methods.

The essential steps of the inventive image reconstruction method are schematically summarized in FIG. 3. First, the detector data with the associated positions relative to the object 1 as well as the remaining input entries are provided with step S1. Subsequently, the reconstructing step S2 with finding the object minimizing functional of equation (3) is conducted, followed by step S3 of presenting the reconstructed image consisting of the minimizer of the functional.

Step S1 in particular includes the provision (step S11) of the detector data (as measured preferably) from positions and associated angles of the detector elements 23. Step S11 depends on particular application conditions and the data source used. The detector data and positions can be measured (step S01) and input directly from the detector device 20 (FIG. 1 or 2). In this case, the procedure of FIG. 3 including the step S01 represents an embodiment of the inventive imaging method. Measuring the detector data is conducted as commonly known from CT or X-ray transmission devices. Optionally, selecting a number of measurements in dependence on the image quality to be obtained can be provided on the basis of the considerations summarized below. Furthermore, as an alternative, the detector data and positions can be input via a data communication channel (step S02). With this variant, steps S1 to S3 represent an embodiment of the inventive image reconstruction method.

Step S1 further includes step S12 of determining a sparsity basis T which is suitable for the measured object, e.g. a wavelet basis with finite support. Depending on the type of object, the basis can be stored in the entry storage 34 (FIG. 1 or 2). Furthermore, step S1 includes the provision of a predetermined system matrix $A_{ij}$ (step S13). The system matrix is computed or acquired from reference system data. In particular, the system matrix represents the contribution of the j-th voxel to the i'-th detector data (FIG. 1 or 2).

With step S2, the data processing is conducted including the minimization routine, in which the three-dimensional object is sought, which realizes the global minimum of the object minimizing functional of equation (3). Details of this functional are outlined in section 3. below.

Finally, the result of the minimization routine is output as the final result with step S3, where it is transferred e.g. to a Dicom-node included in the output circuit 33 (FIG. 1 or 2).

3. Mathematical Background

In the following, it is demonstrated that the disappointing and seemingly counterintuitive result presented by Rebecca M. Willett et al. is essentially due to a too restrictive notion of "error": since the variance of a Poissonian random variable increases when its mean value increases, it cannot be expected to obtain the same absolute accuracy when $f^*_j$ is large as when $f^*_j$ is small. Yet the measure of error used in by Rebecca M. Willett et al. was the risk $$R(f^*, f) = \frac{1}{v} \sum_v (f_j - f_j^*)^2$$

(up to normalisation), which does not take this into account. Note that this observation has nothing to do with the type of reconstruction algorithm and lies in the nature of the Poisson statistics.

When the definition of "risk" is modified to reflect this fact, it will be shown that the principles of compressive sensing can indeed be useful and allow the reconstruction of $f_j^*$ faithfully within the bounds given by nature.

3.1 Preliminary Discussion and Notations

Applying the compressed sensing strategy to the above imaging task is base don the following considerations. The conventional approach would be to choose a suitable random matrix $B_{ij}$ of size $k \times v_B$ with $k \ll v_B$, such as for instance suggested for Gaussian noise in [2] or for Poisson noise in [3]. This is, however, not an option in the given geometric setup of a measurement where the system matrix is fixed. The inventors therefore choose a different strategy, which is to take the system matrices $A_{ij}$ and $B_{ii'}$ as given and instead randomly select a small subset of size k of the n potential measurements $y_i$. This is similar to, e.g., [4] but with the important difference that here there is also noise. Note that this randomized selection is a mathematical tool which allows to prove the results. In practice, measuring a completely randomly chosen subset of the available pixels is not necessarily practical since many pixels are combined on a single detector and not measuring some of them would be a waste; instead, however, one could measure the object under a small subset of angles (perhaps randomized) and thus achieve a reduction in measurements. The result shown below is that on average, the reconstruction $\underline{f}$ obtained would give rise to "ideal" (i.e. noiseless) projections $$\overline{\mu}_i = \sum_{i'} B_{ii'} I_0 \exp\left(-\sum_j A_{i'j} f_j\right) + r \quad \left(\overline{\mu}_i = \sum_{i'} B_{ii'} f_{i'}\right)$$

which are very close to the true values $\overline{\mu}^*_i$ (in a sense to be defined in more detail below) even for those of the n potential measurements which were not actually measured but omitted. Thus one obtains a similar result as if one had measured the full set of n potential measurements.

The inventive approach is a mixture between the methods in [2] and [4]. The inventors adapt the methods to deal with noise from [2] to Poisson noise and borrow the strategy of random measurement subsets from [4]. This has the consequence that an important aspect of the usual random matrix approach is lost. Suitable random matrices are with high probability incoherent with any compressibility basis, which means that the compressibility basis is arbitrary. Here, the situation is different (see below).

The number of projections n is assumed to be of the same order as the number of pixels or voxels $v_{A/B}$, i.e. $n = O(v_{A/B})$, such that one could expect to get a good reconstruction with ordinary methods (i.e. without using compressed sensing). Only the small random subset $i \in \Omega \subset \{1, \ldots, n\}$ of the potential projections is actually measured. The set $\Omega$ has size k, and it will be shown in the end that k may be much smaller than n while still allowing for accurate reconstruction. Thus the actual projections are written as $$\mu_i^* = \sum_j P_{ij} \overline{\mu}_j^*, \, i = 1, \ldots, k \quad (6)$$

where $P_{ij}$ is a $k \times n$ random selection matrix of all 0s, except for exactly one 1 at a uniformly distributed random position in each row, with different rows being independent. For each of these random projections one measures a noisy Poisson variable $y_i, i = 1, \ldots, k$. Note that this definition allows, in principle, that multiple measurements of the same projections are made. The probability of this happening is however small when $n \gg k$.

In order to measure the accuracy of the eventual reconstruction the following definition of risk is used. A potential three-dimensional reconstruction $\underline{f}$ would produce ideal projections $$\overline{\mu}_i = \sum_{i'} B_{ii'} I_0 \exp\left(-\sum_j A_{i'j} f_j\right) + r \text{ and has risk } R(\underline{f}) \text{ with} \quad (7)$$

$$R(\underline{f}) = \frac{1}{n} \sum_{i=1}^n (\overline{\mu}_i - \overline{\mu}_i^* \log(\overline{\mu}_i)) =: \frac{1}{n} \sum_{i=1}^n R_i(\overline{\mu}_i).$$

The definition $R_i(\overline{\mu}_i) := \overline{\mu}_i - \overline{\mu}^*_i \log(\overline{\mu}_i)$ will be used below. For the case of planar projections the risk is the same but instead of the volumetric reconstruction it depends on the planar reconstruction $\underline{f}$ via $$\underline{\mu}_i = \sum_{i'} B_{ii'} f_i \text{ and } \overline{\mu}_i^* = \sum_{i'} B_{ii'} f_i^B.$$

For ease of reading, the three-dimensional formulation will be used in the following unless it makes a difference, in which case both variants will be spelt out explicitly.

This definition of risk is modeled after the Maximum Likelihood functional derived from Poisson statistics and honours the fact that the uncertainty in estimating a Poisson parameter $\mu$ is of order $\sqrt{\mu}$ and not a constant. The risk is minimal when $\overline{\mu} = \overline{\mu}^*$, which is the case when $\underline{f} = \underline{f}^{A/B}$. In addition, the "excess risk" defined by $$r(\underline{f}, \underline{f}^*) := R(\underline{f}) - R(\underline{f}^*) \quad (8)$$

will be useful. It is easy to show that if the background count rate $r=0$, the excess risk is a linear function of the intensity $I_0$. This also holds approximately if $I_0 \, r$. Hence the excess risk is a measure for the absolute error in the projections (doubling the averaged measured projection values by doubling the intensity $I_0$ results in twice the excess risk). More important, however, is the relative error, which is $r(\underline{f}, \underline{f}^{A/B})/I_0$. In the end one will obtain an upper bound for $r(\underline{f}, \underline{f}^{A/B})$, and the relative error can be decreased by increasing $I_0$.

This definition of risk is not immediately useful since it requires complete knowledge of $\underline{f}^{A/B}$, which needs to be estimated in the first place. One therefore needs to estimate the risk from the data available, and this leads to the empirical risk $\hat{R}(\underline{f})$:

$$\hat{R}(\underline{f}) = \frac{1}{k}\sum_{i=1}^{k}(\mu_i - y_i\log(\mu_i)) \quad (9)$$

with $$\mu_i = \sum_j P_{ij}\overline{\mu}_j.$$

Again, this is nothing but the Maximum Likelihood functional of Poisson statistics. The function $\hat{R}(\underline{f})$ is an unbiased estimator of $R(\underline{f})$ since on average $$E\hat{R}(\underline{f}) = \sum_P Prob(P)\frac{1}{k}\sum_{i=1}^{k}\left(\sum_{l=1}^{n} P_{il}\overline{\mu}_l - \sum_{l=1}^{n} P_{il}\overline{\mu}_l^*\log\sum_{m=1}^{n} P_{im}\overline{\mu}_m\right) \quad (10)$$

$$= \frac{1}{n^k}\sum_{j_1=1}^{n}\cdots\sum_{j_k=1}^{n}\frac{1}{k}\sum_{i=1}^{k}(\overline{\mu}_{j_i} - \overline{\mu}_{j_i}^*\log(\overline{\mu}_{j_i})) = R(\underline{f}). \quad (11)$$

The average is denoted by E . . . and includes both the average over the Poisson statistics of the $y_i$, to be done first, and over the random matrices P. The random matrices can be written as $P_{ij}=\delta_{j,j_i}$ with $j_1, \ldots, j_k$ independent random integers drawn with uniform probability from the set $\{1, \ldots, n\}$, and the probability of drawing a particular matrix P is thus $$Prob(P) = \frac{1}{n^k}.$$

Inserting this in Eq. (10) leads to Eq. (11).

Analogously to above, the empirical excess risk is defined by $$\hat{r}(\underline{f},\underline{f}^{A/B}) = \hat{R}(\underline{f}) - \hat{R}(\underline{f}^{A/B}). \quad (12)$$

Below the compressibility property of the object $\underline{f}^{A/B}$ in some sparsity basis will be needed. Let $T^{-1}$ be an orthogonal or biorthogonal matrix the rows of which are filled with the basis vectors of the sparsity basis. Then, taking into account only objects $\underline{f}^{A/B}$ for which the coefficients in the sparsity basis, $\underline{\theta}^{A/B}=T^{-1}\underline{f}^{A/B}$, obey $$|\theta_k^{A/B}| \le S\sqrt{v_{A/B}}k^{-1/q}, \quad (13)$$

where S>0 and q>0 are constants and the $\theta_k^{A/B}$ are ordered by size, it can easily be concluded that the error of the best m-term approximation $\underline{\theta}^{(m)}$ to $\underline{\theta}^{A/B}$ is bounded by $$\frac{1}{v_{A/B}}|\underline{\theta}^{(m)} - \underline{\theta}^{A/B}|^2 = \quad (14)$$

$$\frac{1}{v_{A/B}}\sum_{k=m+1}^{v_{A/B}}|\theta_k^{A/B}|^2 \le S^2 \int_m^{v_{A/B}} dx\, x^{-2/q} \le \frac{S^2}{\frac{2}{q}-1}m^{1-2/q} = \frac{S^2}{2\alpha}m^{-2\alpha}$$

with $$\alpha = \frac{1}{q} - \frac{1}{2}.$$

Later, it will also be necessary to estimate the error as measured by the $l_1$ norm, and by a similar calculation one obtains $$|\underline{\theta}^{(m)} - \underline{\theta}^{A/B}|_1 = \sum_{k=m+1}^{v_{A/B}}|\theta_k^{A/B}| \le \frac{S\sqrt{v_{A/B}}}{\alpha - \frac{1}{2}}m^{\frac{1}{2}-\alpha} \quad (15)$$

In order for this to be useful, it is necessary require that $$\alpha > \frac{1}{2},$$

such that 0<q<1, i.e. the objects considered need to be reasonably strongly compressible.

For the "real-space" object $\underline{f}^{(m)}=T\underline{\theta}^{(m)}$ it follows that $$\frac{1}{v}|\underline{f}^{(m)} - \underline{f}^{A/B}|^2 = \quad (16)$$

$$\frac{1}{v}|T(\underline{\theta}^{(m)} - \underline{\theta}^{A/B})|^2 \le \frac{1}{v}\|T\|^2|\underline{\theta}^{(m)} - \underline{\theta}^{A/B}|^2 \le \|T\|^2\frac{S^2}{2\alpha}m^{-2\alpha}$$

with the $l_2$ matrix norm $\|\cdot\|$. Likewise it can be shown that this implies $$\frac{1}{v_{A/B}}|\underline{f}^{A/B}|^2 = \frac{1}{v_{A/B}}|T\underline{\theta}^{A/B}|^2 \le \|T\|^2 D^2 \quad (17)$$

with some positive constant D, i.e. the objects $\underline{f}^{A/B}$ come from a ball of radius $\|T\|D\sqrt{v_{A/B}}$.

3.2 Oracle Inequality

Although the risk $R(\underline{f})$ is not directly applicable, it is very useful since it allows one to derive an "oracle inequality" which states that the average empirical risk $ER(\underline{f})$ of a reconstruction (obtained in a way to be described below) taken from a candidate set is, roughly speaking, within a constant factor of the ideal risk $R(\underline{f}_{min})$ of the best approximation $\underline{f}_{min}$ in the candidate set.

This means that even if one had complete knowledge of $\underline{f}^{A/B}$ and could thus find the optimal approximation in the candidate set, this optimal approximation would be only marginally better than what can be found without this prior knowledge.

Following [2] very closely, it will be shown that for $$\hat{\underline{f}}_{min} = \operatorname*{argmin}_{\underline{f}}\left(\hat{R}(\underline{f}) + \frac{c(\underline{f})\log 2}{k\delta}\right), \quad (18)$$

where $c(\underline{f})$ is a penalty term involving the $l_0$ norm denoted by $|\ldots|_0$ of the form $$c(\underline{f}) = \text{const.} \times \log(v)|T^{-1}\underline{f}|_0, \quad (19)$$

the risk is bounded by $$Er(\hat{\underline{f}}_{min}, \underline{f}^{A/B}) \le C_1\left(r(\underline{f}_{min}, \underline{f}^{A/B}) + \frac{c(\underline{f}_{min})\log 2 + 4}{k\grave{o}}\right) \quad (20)$$

with a constant $C_1$ of order 1 and $\grave{o}$ a constant to be specified later.

3.2.1. Proof of the Oracle Inequality

Consider $$\hat{r}(\underline{f}, \underline{f}^{A/B}) = \frac{1}{k}\sum_{i=1}^{k}[\mu_i - y_i\log(\mu_i) - (\mu_i^* - y_i\log(\mu_i^*))] \quad (21)$$

$$=: -\frac{1}{k}\sum_{i=1}^{k} u_i. \quad (22)$$

Abbreviating $\mu_i - y_i \log(\mu_i) = \xi_i$ and $\mu^*_i - y_i \log(\mu^*_i) = \xi^*_i$, one has $u_i = \xi^*_i - \xi_i$. The $u_i$ are independent, identically distributed random variables. Furthermore, $$r(\underline{f}, \underline{f}^{A/B}) = \quad (23)$$

$$\frac{1}{k}\sum_{i=1}^{k}\left[\underbrace{\frac{1}{n}\sum_{j=1}^{n}(\overline{\mu}_j - \overline{\mu}_j^*\log(\overline{\mu}_j))}_{=E\xi_i} - \underbrace{\left(\frac{1}{n}\sum_{j=1}^{n}(\overline{\mu}_j^* - \overline{\mu}_j^*\log(\overline{\mu}_j^*))\right)}_{=E\xi_i^*}\right]$$

$$= -\frac{1}{k}\sum_{i=1}^{k} Eu_i, \quad (24)$$

so $$r(\underline{f}, \underline{f}^{A/B}) - \hat{r}(\underline{f}, \underline{f}^{A/B}) = \frac{1}{k}\sum_{j=1}^{k}(u_j - Eu_j).$$

Then the Craig-Bernstein inequality [5] can be applied which states that the probability of $$\frac{1}{k}\sum_{j=1}^{k}(u_j - Eu_j) \ge \frac{t}{k\grave{o}} + k\grave{o}\frac{\text{Var}\left(\frac{1}{k}\sum_{j=1}^{k}u_j\right)}{2(1-\zeta)} \quad (25)$$

is less than or equal to $e^{-t}$ for $0 < \grave{o}h \le \zeta < 1$ and $t > 0$, provided the moment condition $$E|u_j - Eu_j|^l \le \frac{l!\text{Var}(u_j)h^{l-2}}{2} \quad (26)$$

holds for all $l \ge 2$ and some fixed $h > 0$. It will be shown below that one can find a certain h such that the moment condition holds for $u_j$. It will also be seen that $$\text{Var}\left(\frac{1}{k}\sum_{j=1}^{k} u_j\right) = \frac{1}{k^2}\sum_{j=1}^{k}\text{Var}(u_j) \le \frac{C}{k}r(\underline{f},\underline{f}^*)$$

with a constant C. Armed with these two facts, one concludes that appropriate $\grave{o}$ and $\zeta$ can be found such that the probability of $$r(\underline{f}, \underline{f}^{A/B}) - \hat{r}(\underline{f}, \underline{f}^{A/B}) \ge \frac{t}{k\grave{o}} + \grave{o}\frac{C}{2(1-\zeta)}r(\underline{f},\underline{f}^{A/B}) \quad (27)$$

is less than $e^{-t}$. One now introduces a finite candidate set F from which to find a good approximation to $\underline{f}^{A/B}$. To each $\underline{f}$ a penalty $c(\underline{f})$ is assigned which obeys $$\sum_{\underline{f} \in F} 2^{-c(\underline{f})} \le 1.$$

At this stage the candidate set and the penalty are completely arbitrary, as long as this inequality holds. Setting $\delta := e^{-t}$ and inserting $\delta(\underline{f}) := 2^{-c(\underline{f})}\delta$ in place of $e^{-t}$ in Ineq. (27), the probability that at least one $\underline{f} \in F$ violates Ineq. (27) is less than $$\sum_{\underline{f} \in F} \delta(\underline{f}) \le \delta$$

(Boole's inequality). With probability $1-\delta$ therefore, the inequality $$r(\underline{f}, \underline{f}^{A/B}) - \hat{r}(\underline{f}, \underline{f}^{A/B}) \le \frac{c(\underline{f})\log 2 - \log\delta}{k\grave{o}} + \grave{o}\frac{C}{2(1-\zeta)}r(\underline{f},\underline{f}^{A/B}) \quad (28)$$

holds for all $\underline{f} \in F$.

Let $\zeta = \grave{o}h$ and $$a := \frac{\grave{o}C}{2(1-\zeta)}.$$

Then choosing some $$0 < \grave{o} < \frac{2}{C+2h}$$

guarantees that $0 < a < 1$ and $\zeta < 1$. Therefore $$(1-a)r(\underline{f},\underline{f}^{A/B}) \le \hat{r}(\underline{f},\underline{f}^{A/B}) + \frac{c(\underline{f})\log 2 - \log\delta}{k\grave{o}} \quad (29)$$

with probability at least $1-\delta$ for all $\underline{f} \in F$ and all $0 < \delta \le 1$.

The bound on the risk is minimal for that $\underline{f}$ which minimizes the penalized empirical risk:

$$\hat{f}_{min} = \underset{f \in F}{\operatorname{argmin}}\left(\hat{r}(\underline{f}, \underline{f}^{A/B}) + \frac{c(\underline{f})\log 2}{k\partial}\right) = \underset{f \in F}{\operatorname{argmin}}\left(\hat{R}(\underline{f}) + \frac{c(\underline{f})\log 2}{k\partial}\right). \quad (30)$$

Let $\underline{f}_{min}$ be the element of F which minimizes the penalized (true) risk, i.e.

$$\underline{f}_{min} = \underset{f \in F}{\operatorname{argmin}}\left(R(\underline{f}) + \frac{c(\underline{f})\log 2}{k\partial}\right), \quad (31)$$

then $$(1-a)r(\hat{\underline{f}}_{min}, \underline{f}^{A/B}) \leq \hat{r}(\underline{f}_{min}, \underline{f}^{A/B}) + \frac{c(\underline{f}_{min})\log 2 - \log \delta}{k\partial} \quad (32)$$

(with probability at least 1−δ) since $\underline{f}_{min}$ minimizes the penalized empirical risk, and replacing it by $\underline{\hat{f}}_{min}$ on the right hand side can only make the bound bigger.

Repeating the application of the Craig-Bernstein inequality for $\hat{r}(\underline{f}_{min}, \underline{f}^{A/B}) - r(\underline{f}_{min}, \underline{f}^{A/B})$ (note that the sign is reversed as compared to the above discussion, but the Craig-Bernstein inequality can be employed either way) yields $$\hat{r}(\underline{f}_{min}, \underline{f}^{A/B}) - r(\underline{f}_{min}, \underline{f}^{A/B}) \leq ar(\underline{f}_{min}, \underline{f}^{A/B}) - \frac{\log \delta}{k\partial} \quad (33)$$

with probability at least 1−δ. Using Boole's inequality again to estimate the probability that Ineqs. (32) and (33) are simultaneously satisfied yields $$r(\hat{\underline{f}}_{min}, \underline{f}^{A/B}) \leq \frac{1+a}{1-a}r(\underline{f}_{min}, \underline{f}^{A/B}) + \frac{c(\underline{f}_{min})\log 2 - 2\log \delta}{k\partial(1-a)} \quad (34)$$

with probability at least 1−2δ.

Since for any random variable X, $$EX \leq \int_0^\infty dt\, Prob(X \geq t),$$

one can choose $$X = r(\hat{\underline{f}}_{min}, \underline{f}^{A/B}) - \frac{1+a}{1-a}r(\underline{f}_{min}, \underline{f}^{A/B}) - \frac{c(\underline{f}_{min})\log 2}{k\partial(1-a)} \text{ and } \delta = e^{-k\partial t(1-a)/2}$$

and integrate Ineq. (34) over t, which finally gives a bound for $Er(\hat{\underline{f}}_{min}, \underline{f}^{A/B})$:

$$Er(\hat{\underline{f}}_{min}, \underline{f}^{A/B}) \leq \frac{1+a}{1-a}r(\underline{f}_{min}, \underline{f}^{A/B}) + \frac{c(\underline{f}_{min})\log 2 + 4}{k\partial(1-a)} \quad (35)$$

$$\leq \frac{1+a}{1-a}\left(r(\underline{f}_{min}, \underline{f}^{A/B}) + \frac{c(\underline{f}_{min})\log 2 + 4}{k\partial}\right). \quad (36)$$

This is the inequality announced above with $$C_1 = \frac{1+a}{1-a}.$$

3.2.2. Proof of the Moment Condition

For the proof of the moment conditions one has to deal with two difficulties: first, the random variables are not simple independent Gaussians as in [2] but Poissonians dependent on the values $\mu_i$ which are themselves random variables, and second, one can not use Rademacher chaos. Rademacher chaos, by its randomization of signs, can deal with sparsity in any basis (the measurement basis is with high probability incoherent with any other basis). Here, it will be seen that the sparsity basis T must be incoherent with the system matrix A. This is in line with the results from [4].

One needs to show that the moment condition (26) holds for some h>0 and all l≥2. According to [2] it is sufficient to find a suitable constant h' for all even l as this implies that the moment condition holds for all l with h=2h' (Lemma 1 of [2]). The random variable $u_j - Eu_j$ can be split into two parts, $u_j - Eu_j = X_1 + X_2$, with $$X_1 := -(\mu_j - E\mu_j) + \mu^*_j \log(\mu_j) - E\mu^*_j \log(\mu_j) + \mu^*_j - E\mu^*_j - (\mu^*_j \log(\mu^*_j) - E\mu^*_j \log(\mu^*_j)) \quad (37)$$

$$X_2 := (y_j - \mu^*_j)\log(\mu_j) - (y_j - \mu^*_j)\log(\mu^*_j), \quad (38)$$

each of which is a random variable with zero mean. Furthermore, $EX_1 X_2 = 0$. One can therefore apply Lemma 2 of [2] and conclude that $X_1 + X_2$ satisfies the moment condition (26) for all even l≥4 with constant $h' = \sqrt{2}(h_1 + h_2)$ if $X_1$ and $X_2$ satisfy them separately with constants $h_1$ and $h_2$.

Moment Condition for $X_1$ and $X_2$

A bounded random variable X with zero mean and $|X| \leq X_{max}$ satisfies the moment condition trivially with constant $h_X = X_{max}/3$. If it is observed that $$\overline{\mu}^*_i = I_0 \exp\left(-\sum_j A_{ij} f_j^{A/B}\right) + r \leq A_{max}, \quad (39)$$

where $A_{max}$ is the maximum dose per pixel (plus background count rate) of the CT (or X-ray or other device at hand), then $\overline{\mu}^*_i$ is upper bounded by the constant $A_{max}$. This follows since both $f_i^{A/B}$ and $A_{ij}$ are nonnegative. Without loss of generality we have $A_{max} > 1$. Note that $A_{max}$ is a machine constant and does not depend on $v_{A/B}$.

Since $\overline{\mu}^*_j$ is also bounded from below by r, one may write (increasing $A_{max}$ if necessary)

$$\overline{\mu}^*_j \geq \frac{1}{A_{max}}. \quad (40)$$

By the same argument the same bounds hold for the candidate projections $\mu_i$. It then follows that $|X_1| \leq \text{const.} \times A_{max} \log(A_{max})$, and thus the moment condition holds.

It remains to show that the moment condition also holds for $X_2$. Consider $$EX_2^{2m} = \frac{1}{n}\sum_{i=1}^n M_{2m}(\overline{\mu}^*_i)\log^{2m}\left(\frac{\overline{\mu}_i}{\overline{\mu}^*_i}\right) \quad (41)$$

$$= \frac{1}{n}\sum_{i=1}^{n} M_2(\overline{\mu}_i^*)\log^2\left(\frac{\overline{\mu}_i}{\overline{\mu}_i^*}\right)\frac{M_{2m}(\overline{\mu}_i^*)}{M_2(\overline{\mu}_i^*)}\log^{2m-2}\left(\frac{\overline{\mu}_i}{\overline{\mu}_i^*}\right). \quad (42)$$

Here $M_{2m}(\mu)$ is the 2m-th central moment of a Poisson variable with parameter $\mu$. The second logarithm on the right hand side can be estimated by $$\log^{2m-2}\left(\frac{\overline{\mu}_i}{\overline{\mu}_i^*}\right) \leq \log^{2m-2}(A_{max}^2). \quad (43)$$

It is shown in the Appendix that the central moments obey $M_{2m}(\mu) \leq (2m)!(\max(1,\mu))^m$, such that $$\frac{M_{2m}(\overline{\mu}_i^*)}{M_2(\overline{\mu}_i^*)} \leq (2m)!\frac{(\max(1,\overline{\mu}_i^*))^m}{\overline{\mu}_i^*} \leq (2m)!A_{max}^{\frac{2m-2}{2}}\frac{\max(1,\overline{\mu}_i^*)}{\overline{\mu}_i^*} \quad (44)$$

$$\leq (2m)!\sqrt{A_{max}}^{2m-2}A_{max} \leq \frac{(2m)!}{2}(\sqrt{2}A_{max})^{2m-2}. \quad (45)$$

The last step is valid for all $m \geq 2$. Together one obtains the bound $$EX_2^{2m} \leq \frac{(2m)!}{2}\frac{1}{n}\sum_{i=1}^{n} M_2(\overline{\mu}_i^*)\log^2\left(\frac{\overline{\mu}_i}{\overline{\mu}_i^*}\right)(2\sqrt{2}A_{max}\log(A_{max}))^{2m-2} \quad (46)$$

$$= \frac{(2m)!}{2}\mathrm{Var}(X_2)(2\sqrt{2}A_{max}\log(A_{max}))^{2m-2}, \quad (47)$$

which is the moment condition for $X_2$.

Taken together, it is now established that $X_1 + X_2$ obey the moment condition with a parameter h with $$h = \mathrm{const.} \times A_{max}\log(A_{max}). \quad (48)$$

2. The Upper Bound for $\mathrm{Var}(u_j)$

The last task is to find an upper bound for $\mathrm{Var}(u_j)$, where $u_j = \xi^*_j - \xi_j$ and $\xi^*_j = \mu^*_j - y_j\log(\mu^*_j)$, $\xi_j = \mu_j - y_j\log(\mu_j)$. It is easy to show that the average values $Eu_j$ and $Eu_j^2$ are given by $$Eu_j = -\frac{1}{n}\sum_{l=1}^{n}(R_l(\underline{f}) - R_l(\underline{f}^{A/B})) \quad (49)$$

$$Eu_j^2 = \frac{1}{n}\sum_{l=1}^{n}\left[(R_l(\underline{f}) - R_l(\underline{f}^{A/B}))^2 + \overline{\mu}_l^*(\log(\overline{\mu}_l) - \log(\overline{\mu}_l^*))^2\right]. \quad (50)$$

For the definition of $R_l(\underline{f})$ see Sec. 2. The variance is then $$\mathrm{Var}(u_j) = \frac{1}{n^2}\sum_{l,l'=1}^{n}(R_l(\underline{f}) - R_l(\underline{f}^{A/B}))(R_{l'}(\underline{f}) - R_{l'}(\underline{f}^{A/B}))(n\delta_{ll'} - 1) + \quad (51)$$

$$\frac{1}{n}\sum_{l=1}^{n}\overline{\mu}_l^*(\log(\overline{\mu}_l) - \log(\overline{\mu}_l^*))^2$$

$$\leq \frac{n-1}{n^2}\sum_{l=1}^{n}(R_l(\underline{f}) - R_l(\underline{f}^{A/B}))^2 + \frac{1}{n}\sum_{l=1}^{n}\overline{\mu}_l^*(\log(\overline{\mu}_l) - \log(\overline{\mu}_l^*))^2. \quad (52)$$

The inequality follows because each term $R_l(\underline{f}) - R_l(\underline{f}^{A/B})$ is nonnegative and one may thus omit some of the terms with a negative sign in the first sum by replacing $n\delta_{ll'} - 1$ by $n\delta_{ll'} - \delta_{ll'}$. Since $$\frac{1}{A_{max}} \leq \overline{\mu}_l, \overline{\mu}_l^* \leq A_{max},$$

it follows that $$R_l(\underline{f}) - R_l(\underline{f}^{A/B}) \leq A_{max} - \frac{1}{A_{max}} + 2A_{max}\log(A_{max}), \quad (53)$$

such that $$\frac{n-1}{n^2}\sum_{l=1}^{n}(R_l(\underline{f}) - R_l(\underline{f}^{A/B}))^2 \leq \quad (54)$$

$$\left(A_{max} - \frac{1}{A_{max}} + 2A_{max}\log(A_{max})\right)\frac{1}{n}\sum_{l=1}^{n}(R_l(\underline{f}) - R_l(\underline{f}^{A/B}))$$

$$= \left(A_{max} - \frac{1}{A_{max}} + 2A_{max}\log(A_{max})\right)r(\underline{f}, \underline{f}^{A/B}). \quad (55)$$

It remains to bound the term $$\frac{1}{n}\sum_{l=1}^{n}\overline{\mu}_l^*(\log(\overline{\mu}_l) - \log(\overline{\mu}_l^*))^2.$$

In order to do so, consider the functions $h_y(x) = y(\log x - \log y)^2$ and $g_y(x) = x - y\log x - (y - y\log y)$. They both attain their global minimum 0 at $x = y$ and have zero derivative there. Their second derivatives are $$h_y''(x) = \frac{2y}{x^2}(1 + \log y - \log x) \text{ and } g_y''(x) = \frac{y}{x^2},$$

which implies $$h_y''(x) \leq 2(1 + |\log y - \log x|)g_y'(x) \leq 2(1 + 2\log(A_{max}))g_y'(x) \text{ for }$$

$$\frac{1}{A_{max}} \leq x, y \leq A_{max}.$$

Therefore $h_y(x) \leq 2(1 + 2\log(A_{max}))g_y(x)$. Consequently, $$\frac{1}{n}\sum_{l=1}^{n}\overline{\mu}_l^*(\log(\overline{\mu}_l) - \log(\overline{\mu}_l^*))^2 \leq \quad (56)$$

$$2(1 + 2\log(A_{max}))\frac{1}{n}\sum_{l=1}^{n}(R_l(\underline{f}) - R_l(\underline{f}^{A/B}))$$

$$= 2(1 + 2\log(A_{max}))r(\underline{f}, \underline{f}^{A/B}). \quad (57)$$

Combined, one obtains $$\operatorname{Var}(u_j) \leq Cr(\underline{f}, \underline{f}^{A/B}) \quad (58)$$

with $$C = (A_{max} + 2)(2\log(A_{max}) + 1) - \frac{1}{A_{max}}. \quad (59)$$

3.3 Application of the Oracle Inequality to Compressible Objects

A compressible object $\underline{f}^{A/B}$ is one which can be represented accurately by a small number of coefficients in some basis. To be precise, if $$f_i^{A/B} = \sum_j T_{ij} \theta_j^{A/B}$$

where $T_{ij}$ is an biorthogonal matrix and $\theta_j^{A/B}$ are the coefficients, and if $\underline{f}^{(m)}$ is the best m-term approximation to $\underline{f}^{A/B}$ in this basis, then as shown above the error $$\frac{1}{v_{A/B}} |\underline{f}^{(m)} - \underline{f}^{A/B}|^2 \leq \|T\|^2 \frac{S}{2\alpha} m^{-2\alpha} \quad (60)$$

decays at least as fast as $m^{-2\alpha}$ if $\underline{f}^{A/B}$ is compressible. Such compressible objects also lie within a ball of radius $\|T\|D\sqrt{v_{A/B}}$ with some constant $D>0$.

From the oracle inequality it is known that $$Er(\hat{\underline{f}}_{min}, \underline{f}^{A/B}) \leq C_1 \left( r(\underline{f}_{min}, \underline{f}^{A/B}) + \frac{c(\underline{f}_{min})\log 2 + 4}{k\delta} \right),$$

where $\underline{f}_{min}$ is that vector from the candidate set F which minimizes the risk. This can be reformulated in terms of the coefficient vectors $\underline{\theta}^{A/B}$ of $\underline{f}^{A/B}$, $\underline{\theta}$ of $\underline{f}$ and $\underline{\theta}_{min}$ of $\underline{f}_{min}$:

$$Er(\hat{\underline{f}}_{min}, \underline{f}^{A/B}) \leq C_1 \left( r(T\underline{\theta}_{min}, T\underline{\theta}^{A/B}) + \frac{c(T\underline{\theta}_{min})\log 2 + 4}{k\delta} \right). \quad (61)$$

The candidate set F is chosen to consist of all $\underline{f}$ which satisfy the bounds $f_i \geq 0$ and $|\underline{f}| \leq \|T\|D\sqrt{v_{A/B}}$, are compressible and which have a representation $\underline{f} = T\underline{\theta}$ where the coefficients $\theta_i$ are uniformly quantized to $v^p$ levels. Let T be the set of coefficient vectors $\underline{\theta}$ corresponding to the set F. The penalty is chosen to be $$c(T\underline{\theta}) = (1+p)\log(v_{A/B})|\underline{\theta}|_0, \quad (62)$$

i.e. equal to the $l_0$-norm (the number of non-zero elements) of $\underline{\theta}$, up to a factor. This penalty satisfies $$\sum_{\underline{\theta} \in T} 2^{-c(\underline{\theta})} \leq 1,$$

which is called Kraft inequality in this context. It will also be denoted by $c(\underline{\theta})$ (instead of $c(T\underline{\theta})$) for brevity.

Let $\underline{\theta}^{(m)}$ be the coefficient vector corresponding to the best m-term approximation to $\underline{f}^{A/B}$, i.e. $\underline{f}^{(m)} = T\underline{\theta}^{(m)}$, and let $\underline{\theta}_q^{(m)} \in T$ be the closest element to $\underline{\theta}^{(m)}$ in T. One can now replace $\underline{\theta}_{min}$ in the oracle inequality by $\underline{\theta}_q^{(m)}$ since $$r(T\underline{\theta}_{min}, T\underline{\theta}^{A/B}) + \frac{c(\underline{\theta}_{min})\log 2 + 4}{k\delta} \leq r(T\underline{\theta}_q^{(m)}, T\underline{\theta}^{A/B}) + \frac{c(\underline{\theta}_q^{(m)})\log 2 + 4}{k\delta}$$

by definition of $\underline{\theta}_{min}$.

Next one can estimate $r(T\underline{\theta}_q^{(m)}, T\underline{\theta}^{A/B})$ by noting that $$r(T\underline{\theta}_q^{(m)}, T\underline{\theta}^{A/B}) = \quad (63)$$

$$\frac{1}{n} \sum_{k=1}^{n} \overline{\mu}_k^* \left( \frac{\overline{\mu}_k}{\overline{\mu}_k^*} - 1 - \log \frac{\overline{\mu}_k}{\overline{\mu}_k^*} \right) \leq \frac{1}{n} \sum_{k=1}^{n} \max\left(1, \frac{\overline{\mu}_k^*}{\overline{\mu}_k}\right) |\overline{\mu}_k^* - \overline{\mu}_k|.$$

This follows from the easily provable property $$x - 1 - \log x \leq \max\left(x, \frac{1}{x}\right) - 1$$

for all $x>0$. One must now distinguish between three-dimensional and planar imaging. For three-dimensional reconstruction one has $$\overline{\mu}_k^* = I_0 \sum_{i'} B_{ki'} \exp\left(-\sum_{jl} A_{i'j} T_{jl} \theta_l^A\right) + r, \quad (64)$$

while for planar imaging $$\overline{\mu}_k^* = \sum_{i'l} B_{ki'} T_{i'l} \theta_l^B + r. \quad (65)$$

Analogous expressions hold for $\overline{\mu}_k$ by replacing $\theta_l^{A/B}$ by $\theta_{q,l}^{(m)}$.

In the former case one has for $\overline{\mu}_k^* \geq \overline{\mu}_k$ $$0 \leq \overline{\mu}_k^* - \overline{\mu}_k = \quad (66)$$

$$I_0 \sum_{i'} B_{ki'} \exp\left(-\sum_{jl} A_{i'j} T_{jl} \theta_l^A\right) \left(1 - \exp\left(-\sum_{jl} A_{i'l} T_{jl} (\theta_{q,l}^{(m)} - \theta_l^A)\right)\right)$$

$$\leq I_0 \sum_{i'} B_{ki'} \exp\left(-\sum_{jl} A_{i'j} T_{jl} \theta_l^A\right) \left|\sum_{jl} A_{i'j} T_{jl} (\theta_{q,l}^{(m)} - \theta_l^A)\right| \quad (67)$$

and for $\overline{\mu}_k^* < \overline{\mu}_k$ $$0 \leq \overline{\mu}_k^* - \overline{\mu}_k = \quad (68)$$

$$I_0 \sum_{i'} B_{ki'} \exp\left(-\sum_{jl} A_{i'j} T_{jl} \theta_{q,l}^{(m)}\right) \left(1 - \exp\left(-\sum_{jl} A_{i'l} T_{jl} (\theta_l^A - \theta_{q,l}^{(m)})\right)\right)$$

$$\leq I_0 \sum_{i'} B_{ki'} \exp\left(-\sum_{jl} A_{i'j} T_{jl} \theta_{q,l}^{(m)}\right) \left|\sum_{jl} A_{i'j} T_{jl} (\theta_l^A - \theta_{q,l}^{(m)})\right|, \quad (69)$$

both of which follows from the relation $1 - \exp(-x) \leq x$ for all x. Note that the part within the modulus bars will be estimated by a constant below and the remaining parts in Eqs. (67) and (69) are simply equal to $\overline{\mu}_k^* - r$ and $\overline{\mu}_k - r$, respectively.

In the latter case, on the other hand, one has $$\left|\bar{\mu}_k^* - \bar{\mu}_k\right| = \left|\sum_{i'l} B_{ki'} T_{i'l}(\theta_l^B - \theta_{q,l}^{(m)})\right|. \tag{70}$$

In both cases, one needs to bound an expression of the form $$\left|\sum_{jl} A_{i'j} T_{jl}(\theta_l^A - \theta_{q,l}^{(m)})\right| \leq \tag{71}$$

$$\sum_l \left|\sum_j A_{i'j} T_{jl}\right| |\theta_l^A - \theta_{q,l}^{(m)}| \leq \max_{rs} |(AT)_{rs}| \sum_l |\theta_l^A - \theta_{q,l}^{(m)}|,$$

with the matrix B in place of A and $\theta_l^B$ instead of $\theta_l^A$ for the planar case. At this stage it becomes clear that the incoherence $$J_A = \max_{rs} |(AT)_{rs}| \text{ resp.} \tag{72}$$

$$J_B = \max_{rs} |(BT)_{rs}| \tag{73}$$

between the system matrix A (resp. B) and the sparsity basis T enters the problem. Bounding the remaining term $$\sum_l |\theta_l^{A/B} - \theta_{q,l}^{(m)}|$$

is easy, due to the compressibility property and the fact that $\underline{\theta}^{(m)}$ is the best m-term approximation to $\underline{\theta}^*$. The bound is given by $$\sum_l |\theta_l^{A/B} - \theta_{q,l}^{(m)}| \leq \sum_l (|\theta_l^{A/B} - \theta_l^{(m)}| + |\theta_l^{(m)} - \theta_{q,l}^{(m)}|) \tag{74}$$

$$\leq \frac{\sqrt{v_{A/B}} S}{\alpha - \frac{1}{2}} m^{\frac{1}{2} - \alpha} + \frac{2D}{v_{A/B}^{p-3/2}}. \tag{75}$$

Since it is exponentially small, the second term on the right hand side is irrelevant and will be omitted in the following.

With these results, it is finally possible to bound the excess risk by $$r(T\underline{\theta}_q^{(m)}, T\underline{\theta}^A) \leq \tag{76}$$

$$\frac{1}{n} \sum_{k=1}^n \max\left(1, \frac{\bar{\mu}_k^*}{\bar{\mu}_k}\right) \max(\bar{\mu}_k - r, \bar{\mu}_k^* - r) \frac{J_A \sqrt{v_A} S}{\alpha - \frac{1}{2}} m^{\frac{1}{2} - \alpha}$$

for three-dimensional imaging and $$r(T\underline{\theta}_q^{(m)}, T\underline{\theta}^B) \leq \frac{1}{n} \sum_{k=1}^n \max\left(1, \frac{\bar{\mu}_k^*}{\bar{\mu}_k}\right) \frac{J_B \sqrt{v_B} S}{\alpha - \frac{1}{2}} m^{\frac{1}{2} - \alpha} \tag{77}$$

for the planar case. This can be further bounded by $$r(T\underline{\theta}_q^{(m)}, T\underline{\theta}^{A/B}) \leq A_{max}^{\beta_{A/B}} \frac{J_{A/B} \sqrt{v_{A/B}} S}{\alpha - \frac{1}{2}} m^{\frac{1}{2} - \alpha} \tag{78}$$

with $\beta_A := 3$ and $\beta_B := 2$. Combined, $$Er(\hat{f}_{min}, \underline{f}^{A/B}) \leq C_1 \left( A_{max}^{\beta_{A/B}} \frac{J_{A/B} \sqrt{v_{A/B}} S}{\alpha - \frac{1}{2}} m^{\frac{1}{2} - \alpha} + \frac{c(\underline{\theta}^{(m)}) \log 2 + 4}{k \delta} \right). \tag{79}$$

These error bounds are minimal when $$m = \left( \frac{(1+p) \log v_{A/B} \log 2}{k \delta A_{max}^{\beta_{A/B}} J_{A/B} \sqrt{v_{A/B}} S} \right)^{-\frac{1}{\alpha + \frac{1}{2}}}. \tag{80}$$

Inserting this in Eq. (79) one obtains $$Er(\hat{f}_{min}, \underline{f}^{A/B}) \leq C_1 C_2^{A/B} \left( \frac{(J_{A/B} \sqrt{v_{A/B}})^{\alpha - \frac{1}{2}} \log v_{A/B}}{k} \right)^{\frac{2\alpha - 1}{2\alpha + 1}} \tag{81}$$

with $$C_2^{A/B} = \frac{2\alpha + 1}{2\alpha - 1} \left( A_{max}^{\beta_{A/B}} S \right)^{\frac{1}{\alpha + \frac{1}{2}}} \left( \frac{(1+p) \log 2}{\delta} \right)^{\frac{2\alpha - 1}{2\alpha + 1}} + \frac{4}{\delta}. \tag{82}$$

Inequality (81) with the factors $C_2^{A/B}$ from Eq. (82) follows if ones assumes that $$\left( J_{A/B} \sqrt{v_{A/B}} \right)^{\alpha - \frac{1}{2}} \log v_{A/B} \geq 1.$$

Recall that one may choose any $$0 < \delta < \frac{2}{C + 2h} = O\left( \frac{1}{A_{max} \log A_{max}} \right).$$

In order to keep the constant $C_1$ close to 1, $\delta$ should not be chosen too close to the upper bound. For instance, the choice $$\delta = \frac{1}{4} \frac{2}{C + 2h} \tag{83}$$

is sensible since it implies $$1 < C_1 < \frac{5}{3}.$$

When the object $\underline{f}^{A/B}$ is truly sparse, i.e. only m coefficients $\theta_i^{A/B}$ are nonzero, the term $|\underline{\theta}^{(m)} - \underline{\theta}^{A/B}| = 0$, so the only relevant term is the penalty term. One then obtains the result $$Er(\hat{\underline{f}}_{min}, \underline{f}^{A/B}) \leq C_1((1+p)\log 2 + 4)\frac{1}{\delta}\frac{m\log v_{A/B}}{k}. \quad (84)$$

3.4 Summary

The important consequence of Eq. (81) can be summarized for the relative error of the reconstruction $\hat{\underline{f}}_{min}$, $$Er\frac{(\hat{\underline{f}}_{min}, \underline{f}^{A/B})}{I_0} \leq const. \times \frac{1}{I_0}\left(\frac{\left(J_{A/B}\sqrt{v_{A/B}}\right)^{-\frac{1}{\alpha-\frac{1}{2}}}\log v_{A/B}}{k}\right)^{\frac{2\alpha-1}{2\alpha+1}}.$$

This means that one can either set an acceptable limit for the relative error and adjust the dose (i.e., $I_0$) and the number of pixels measured, k, to get below this limit, or one can choose $I_0$ and k first and calculate the reliability afterwards. The constant appearing in this equation depends only on $A_{max}$, the maximal dose the device is capable of, and the compressibility properties of the object, namely the exponent $\alpha$. The optimal situation is when $J_{A/B}$, the incoherence between the system matrix and the sparsity basis T, is minimal, i.e. of order $v_{A/B}^{-1/2}$. However, this cannot be guaranteed since the system matrix is fixed and the sparsity basis can only be varied to a certain extent (such that the object remains compressible in this basis). But as long as $J_{A/B} \sim v_{A/B}^{-\gamma}$ with some exponent $\gamma > 1-\alpha$, the expression in brackets can still be small even if $k \ll v_{A/B}$.

3.5 Central Moments of the Poisson Distribution

According to [6] and references therein, the central moments of the Poisson distribution $M_n(\mu)$ obey the following recursion relation:

$$M_n(\mu) = \mu(n-1)!\sum_{i=0}^{n-2}\frac{M_i(\mu)}{i!(n-1-i)!}. \quad (85)$$

In order to show that for all n and $\mu \geq 0$, $M_n(\mu) \leq n!(\max(1,\mu))^{n/2}$, one can start by showing that this is the case for n=0, 1, 2:

$$M_0(\mu) = 1 \leq (\max(1,\mu))^0 = 1 \quad (86)$$

$$M_1(\mu) = 0 \leq (\max(1,\mu))^{1/2} \quad (87)$$

$$M_2(\mu) = \mu \leq 2(\max(1,\mu))^1. \quad (88)$$

Proceeding by induction and assuming that $M_i(\mu) \leq i!(\max(1,\mu))^{1/2}$ holds for all $0 \leq i < n$ yields $$M_n(\mu) = \mu(n-1)!\sum_{i=0}^{n-2}\frac{M_i(\mu)}{i!(n-1-i)!} \quad (89)$$

$$\leq \mu(n-1)\sum_{i=0}^{n-2}\frac{(n-2)!}{i!(n-1-i)!}i!(\max(1,\mu))^{i/2} \quad (90)$$

$$\leq \mu(n-1)\sum_{i=0}^{n-2}\frac{(n-2)!}{i!(n-1-i)!}(\max(1,\mu))^{(n-2)/2} \quad (91)$$

$$\leq \mu(n-1)^2(n-2)!(\max(1,\mu))^{(n-2)/2} \quad (92)$$

$$\leq n!(\max(1,\mu))^{n/2}, \quad (93)$$

which concludes the proof.

4. Experimental Results

Figure 4:
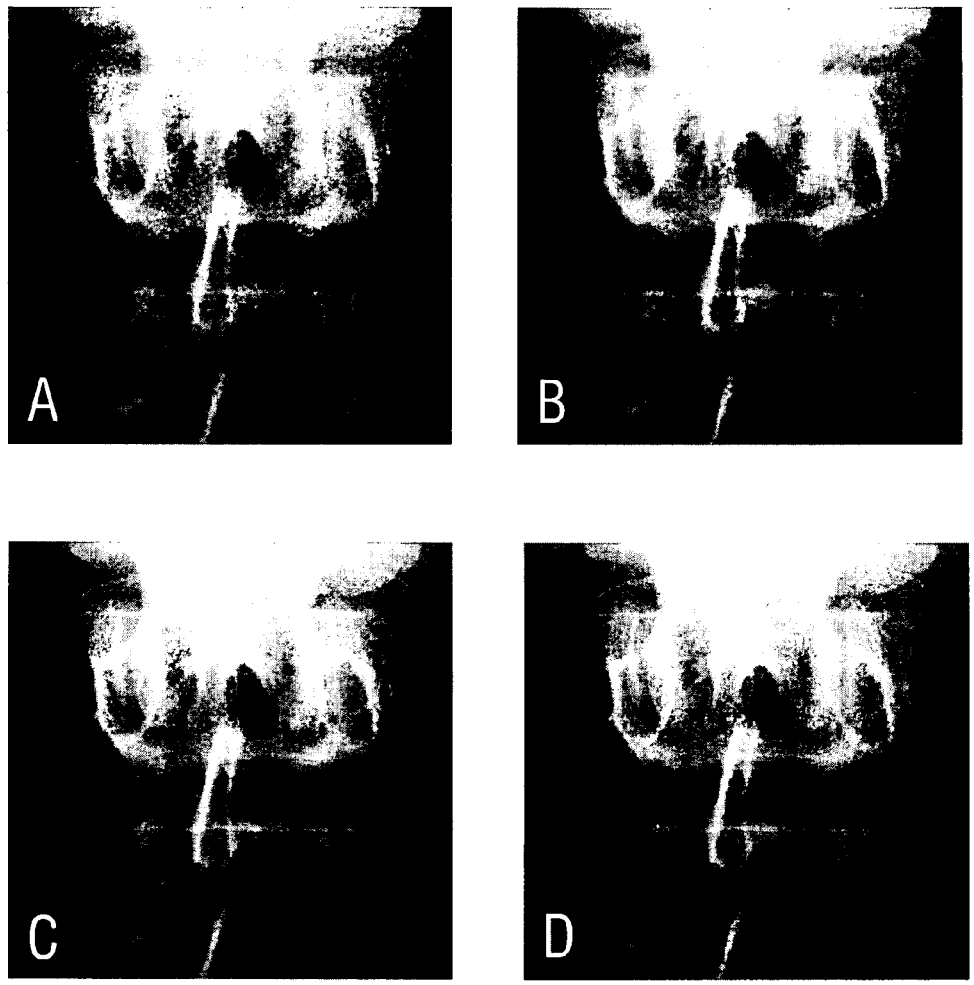
FIG. 4: experimental results illustrating the improved image quality obtained with the present invention.

FIG. 4 shows exemplary images illustrating advantages obtained with the invention. FIG. 4A shows an original X-ray measurement of a thorax phantom with a low dose at 80 kV and 8 mAs source current resulting in a high noise level. FIG. 4C shows a corresponding original X-ray measurement of the thorax phantom with a high dose at 80 kV and 25.6 mAs resulting in a low noise level. If according to FIG. 4B an image reconstruction is applied to the original high noise image of FIG. 4A using the second embodiment of the invention and focussing mainly on the removal of noise, the quality of the result is comparable to the high dose in FIG. 4C. Furthermore, with a reconstruction of FIG. 4C using the invention, focussing mainly on the elimination of the detector response function, the level of detail is greatly enhanced without raising the noise level.

The features of the invention disclosed in the above description, the drawings and the claims can be of significance both individually as well as in combination for the realization of the invention in its various embodiments.

The invention claimed is:

1. An image reconstruction method for reconstructing an image $\underline{f}^{min}$ representing a region of investigation within an object, comprising the steps of:

providing an imaging device for imaging the region of investigation, wherein the imaging device comprises: (a) an X-ray source arranged for irradiating the object with X-rays, (b) a detector device for measuring detector data ($y_i$) comprising Poisson random values measured at a plurality of different pixel positions of the detector device relative to the object, and (c) a reconstruction device for reconstructing the image $\underline{f}^{min}$, providing the detector data ($y_i$) comprising Poisson random values from an X-ray CT imaging measurement of the object using the X-ray source and the detector device, said detector data ($y_i$) being measured at an i-th of a plurality of different pixel positions of the detector device relative to the object, and reconstructing with the reconstruction device the image $\underline{f}^{min}$ as a volumetric reconstruction of the object based on the detector data ($y_i$), said reconstructing including a procedure of minimizing a functional $F(\underline{f})$ $$F(\underline{f}) = \frac{1}{k}\sum_{i=1}^{k}(\mu_i - y_i\log\mu_i) + a|T^{-1}\underline{f}|_p$$

wherein $\underline{f}$ is a current test image used for minimizing the functional $F(\underline{f})$, $$\frac{1}{k}\sum_{i=1}^{k}(\mu_i - y_i\log\mu_i)$$

is a maximum-likelihood risk functional for Poisson statistics, said $\mu_i$ being transmission projections of the current test image $\underline{f}$, said transmission projections being computed according to Beer-Lambert's law at the i-th pixel position relative to the X-ray source as $\mu_i = \Sigma_{i'}B'_{ii'}I_0\exp(-\Sigma_j A_{i'j}f_j)+r$ said $B'_{ii'}$ is a matrix representing a response function of the detector device assigning an i'-th spatial position on the detector surface to the i-th detector data ($y_i$), said $I_0$ is the intensity of an unattenuated X ray beam, said $A_{i'j}$ is a predetermined system matrix assigning a j-th voxel of the reconstruction of the object to the i'-th spatial position on the detector surface, and r is a background count parameter of the detector device, $|T^{-1}\underline{f}|_p$ is a sparsity enforcing functional including the $l_p$ norm of vector $T^{-1}\underline{f}$ with $0 \le p < 2$, said vector $T^{-1}\underline{f}$ being a sparse or compressive representation of $\underline{f}$ in a (bi-) orthogonal basis T, and a is a calibration factor, wherein the image $\underline{f}^{min}$ represents a global minimum of the functional $F(\underline{f})$.

2. The image reconstruction method according to claim 1, wherein at least one of the system matrix $A_{i'j}$ and the response function $B'_{ii'}$ is adjusted depending on measuring system reference data or data acquired using a calibration measurement.

3. The image reconstruction method according to claim 1, wherein the (bi-) orthogonal basis T is one of a basis of wavelets with compact carrier and an adapted basis depending on properties of the object to be imaged.

4. The image reconstruction method according to claim 1, wherein the detector data $(y_i)$ are provided via a data communication channel, from a data storage or directly by the detector device.

5. The image reconstruction method according to claim 1, comprising at least one of the further steps of:

storing, recording, displaying and further processing the image $\underline{f}^{min}$.

6. An imaging method for creating an image $\underline{f}^{min}$ of an object, comprising the steps of:

collecting the detector data $(y_i)$ with the detector device of the imaging device, and subjecting the detector data $(y_i)$ to the image reconstruction method according to claim 1.

7. An imaging device for imaging a region of investigation in an object, the imaging device comprising:

an X-ray source arranged for irradiating the object with X-rays, a detector device for measuring the detector data $(y_i)$ comprising Poisson random values measured at a plurality of different pixel positions of the detector device relative to the object, and a reconstruction device for reconstructing the image $\underline{f}^{min}$ of the object, said reconstruction device being adapted for subjecting the detector data $(y_i)$ to the image reconstruction method according to claim 1.

8. A computer program residing on a non-transitory computer-readable medium, with a program code for carrying out the image reconstruction method according to claim 1.

9. An apparatus comprising a non-transitory computer-readable storage medium containing program instructions for carrying out the image reconstruction method according to claim 1.

10. The image reconstruction method according to claim 1, wherein at least one of the system matrix $A_{i'j}$ and the response function $B'_{ii'}$ is adjusted depending on measuring system reference data or data acquired using a calibration measurement.

11. The image reconstruction method according to claim 1, wherein the functional $F(\underline{f})$ additionally includes an additive regularization function $R(\underline{f})$ suppressing artefacts:

$$F(\underline{f}) = \frac{1}{k}\sum_{i=1}^{k}(\mu_i - y_i \log\mu_i) + a|T^{-1}\underline{f}|_p + R(\underline{f}).$$

12. An image reconstruction method for reconstructing an image $\underline{f}^{min}$ representing an X-ray attenuation image of an object, comprising the steps of:

providing an imaging device for imaging the region of investigation, wherein the imaging device comprises: (a) an X-ray source arranged for irradiating the object with X-rays, (b) a detector device for measuring detector data $(y_i)$ comprising Poisson random values measured at a plurality of different pixel positions of the detector device relative to the object, and (c) a reconstruction device for reconstructing the image $\underline{f}^{min}$, providing the detector data $(y_i)$ comprising Poisson random values from a planar X-ray imaging measurement of the object using the X-ray source and the detector device, said detector data $(y_i)$ being measured at an i-th of a plurality of different pixel positions of the detector device relative to the object, and reconstructing with the reconstruction device the image $\underline{f}^{min}$ as a planar reconstruction of an X-ray attenuation image of the object based on the detector data $(y_i)$, said reconstructing including a procedure of minimizing a functional $F(\underline{f})$ $$F(\underline{f}) = \frac{1}{k}\sum_{i=1}^{k}(\mu_i - y_i \log\mu_i) + a|T^{-1}\underline{f}|_p$$

wherein $\underline{f}$ is a current test image used for minimizing the functional $F(\underline{f})$, said current test image $f_{i'}$ is given in terms of a three dimensional test object $f_j^A$, as $f_{i'} = I_0 \exp(-\Sigma_j A_{i'j} f_j^A)$, said $A_{i'j}$ is a predetermined system matrix assigning a j-th voxel of the three dimensional test object $f_j^A$ to the i'-th spatial position on the detector surface, $$\frac{1}{k}\sum_{i=1}^{k}(\mu_i - y_i \log\mu_i)$$

is a maximum-likelihood risk functional for Poisson statistics, said $\mu_i$ being transmission projections of the current three dimensional test object $f_j^A$, said transmission projections being computed according to Beer-Lambert's law at the i-th pixel position relative to the X-ray source as $\mu_i = \Sigma_{i'} B'_{ii'} I_0 \exp(-\Sigma_j A_{i'j} f_j) + r$ $B'_{ii'}$ is a matrix representing a response function of the detector device assigning an i'-th spatial position on the detector surface to the i-th detector data $(y_i)$, and r is a background count parameter of the detector device, $|T^{-1}\underline{f}|_p$ is a sparsity enforcing functional including the $l_p$ norm of vector $T^{-1}\underline{f}$ with $0 \le p < 2$, said vector $T^{-1}\underline{f}$ being a sparse or compressive representation of $\underline{f}$ in a (bi-) orthogonal basis T, and a is a calibration factor, wherein the image $\underline{f}^{min}$ represents a global minimum of the functional $F(\underline{f})$.

13. The image reconstruction method according to claim 12, wherein at least one of the system matrix A y and the response function $B'_{ii'}$ is adjusted depending on measuring system reference data or data acquired using a calibration measurement.

14. The image reconstruction method according to claim 12, wherein the (bi-) orthogonal basis T is one of a basis of wavelets with compact carrier and an adapted basis depending on properties of the object to be imaged.

15. The image reconstruction method according to claim 12, wherein the detector data ($y_i$) are provided via a data communication channel, from a data storage or directly by the detector device.

16. The image reconstruction method according to claim 12, comprising at least one of the further steps of:
storing, recording, displaying and further processing the image $\underline{f}^{min}$.

17. An imaging method for creating an image $\underline{f}^{min}$ of an object, comprising the steps of:
collecting detector data ($y_i$) with the detector device of the imaging device, and
subjecting the detector data ($y_i$) to the image reconstruction method according to claim 12.

18. An imaging device for imaging a region of investigation in an object, the imaging device comprising:
an X-ray source arranged for irradiating the object with X-rays,
a detector device for measuring detector data ($y_i$) comprising Poisson random values measured at a plurality of different pixel positions of the detector device relative to the object, and
a reconstruction device for reconstructing the image $\underline{f}^{min}$ of the object, said reconstruction device being adapted for subjecting the detector data ($y_i$) to the image reconstruction method according to claim 12.

19. A computer program residing on a non-transitory computer-readable medium, with a program code for carrying out the image reconstruction method according to claim 12.

20. An apparatus comprising a non-transitory computer-readable storage medium containing program instructions for carrying out the image reconstruction method according to claim 12.

21. The image reconstruction method according to claim 12, wherein the functional F($\underline{f}$) additionally includes an additive regularization function R($\underline{f}$) suppressing artefacts:

$$F(\underline{f}) = \frac{1}{k}\sum_{i=1}^{k}(\mu_i - y_i\log\mu_i) + a|T^{-1}\underline{f}|_p + R(\underline{f}).$$

* * * * *